(12) United States Patent
Ono et al.

(10) Patent No.: US 10,286,898 B2
(45) Date of Patent: May 14, 2019

(54) CONTROL DEVICE FOR VEHICLE

(71) Applicant: TOYOTA JIDOSHA KABUSHIKI KAISHA, Toyota-shi (JP)

(72) Inventors: Tomohito Ono, Susono (JP); Takahito Endo, Suntou-gun (JP); Yuji Iwase, Mishima (JP); Makoto Funahashi, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 239 days.

(21) Appl. No.: 15/315,605

(22) PCT Filed: May 26, 2015

(86) PCT No.: PCT/IB2015/000740
§ 371 (c)(1),
(2) Date: Dec. 1, 2016

(87) PCT Pub. No.: WO2015/185971
PCT Pub. Date: Dec. 10, 2015

(65) Prior Publication Data
US 2018/0236998 A1 Aug. 23, 2018

(30) Foreign Application Priority Data
Jun. 2, 2014 (JP) .................................. 2014-114211

(51) Int. Cl.
*B60K 6/383* (2007.10)
*B60W 20/20* (2016.01)
(Continued)

(52) U.S. Cl.
CPC ............. *B60W 20/20* (2013.01); *B60K 6/383* (2013.01); *B60K 6/387* (2013.01); *B60K 6/445* (2013.01);
(Continued)

(58) Field of Classification Search
CPC ...... B60W 20/20; B60W 20/13; B60W 20/40; B60W 2520/10; B60K 6/383; B60K 6/387
See application file for complete search history.

(56) References Cited

U.S. PATENT DOCUMENTS

| 6,054,776 A | 4/2000 | Sumi | |
|---|---|---|---|
| 2016/0325730 A1* | 11/2016 | Ono | B60K 6/383 |

FOREIGN PATENT DOCUMENTS

| JP | 3354074 B2 | 12/2002 |
|---|---|---|
| JP | 2013-096555 A | 5/2013 |

OTHER PUBLICATIONS

International Search Report dated Sep. 30, 2015, in PCT/IB2015/000740, filed May 26, 2015.

* cited by examiner

*Primary Examiner* — Sherry L Estremsky
(74) *Attorney, Agent, or Firm* — Oblon, McClelland, Maier & Neustadt, L.L.P.

(57) ABSTRACT

A control device for a vehicle is provided. The control device includes an ECU. The ECU includes a first traveling mode. The first traveling mode includes a second traveling mode, a third traveling mode, and a fourth traveling mode. The ECU is configured to select the second traveling mode if the vehicle speed is in a low vehicle speed range equal to or lower than a predetermined vehicle speed when the ECU selects the first traveling mode, to select the third traveling mode if the vehicle speed is in a high vehicle speed range equal to or higher than the predetermined vehicle speed, and to select the fourth traveling mode if the vehicle speed is in a vehicle speed range between the low vehicle speed range and the high vehicle speed range.

9 Claims, 12 Drawing Sheets

(51) Int. Cl.
*B60K 6/387* (2007.10)
*B60K 6/445* (2007.10)
*B60W 10/02* (2006.01)
*B60W 10/06* (2006.01)
*B60W 10/08* (2006.01)
*B60W 10/26* (2006.01)
*B60W 20/00* (2016.01)
*B60W 20/14* (2016.01)

(52) U.S. Cl.
CPC ............ *B60W 10/02* (2013.01); *B60W 10/06* (2013.01); *B60W 10/08* (2013.01); *B60W 10/26* (2013.01); *B60W 20/00* (2013.01); *B60W 20/14* (2016.01); *B60W 2510/244* (2013.01); *B60W 2520/10* (2013.01); *Y02T 10/6239* (2013.01); *Y02T 10/6286* (2013.01); *Y02T 10/7258* (2013.01)

A : DISCHARGE TRAVELING MODE DURING
    RESTING OF MG2
B : HV TRAVELING MODE
C : MG2 EV TRAVELING MODE

CONTROL DEVICE FOR VEHICLE

BACKGROUND OF THE INVENTION

1. Field of the Invention

The present invention relates to a control device for a vehicle provided with an engine and a rotary machine as a power source.

2. Description of Related Art

In the related art, as this type of vehicle, a hybrid vehicle is known. For example, Japanese Patent Application Publication No. 2013-096555 (JP 2013-096555 A) discloses a hybrid vehicle provided with an engine, a first motor generator, a second motor generator, and a power distribution mechanism having rotary elements, to which the power sources are separately connected. In this hybrid vehicle, the second motor generator is connected to the rotary element of the power distribution mechanism and the driving wheel through a controllable friction clutch and a one-way clutch arranged in parallel. For this reason, in this hybrid vehicle, the friction clutch is released to separate the second motor generator from a power transmission path, or the friction clutch is engaged to connect the second motor generator to the power transmission path. Japanese Patent No. 3354074 discloses a hybrid vehicle provided with an engine, a motor generator, a power distribution mechanism having a rotary element, to which the power source is connected, and a friction clutch and a one-way clutch arranged in parallel between an engine rotation shaft and an MG rotation shaft. In this hybrid vehicle, the power of the motor generator is transmitted to the engine through the one-way clutch at the time of starting of the engine.

SUMMARY OF THE INVENTION

When the friction clutch and the one-way clutch are arranged in parallel between the second motor generator (second rotary machine), and the rotary element of the power distribution mechanism and the driving wheel, connection or separation of the second motor generator to or from the power transmission path with excellent responsiveness is possible. However, even if the connection state or the disconnection state between the second motor generator and the power transmission path is switched with excellent responsiveness, if a traveling mode in the connection state or the disconnection state is not appropriate, in this hybrid vehicle, drivability deterioration (insufficient drive force in the driving wheel, degradation of output responsiveness of drive force in the driving wheel, or the like), deterioration of fuel efficiency, or the like may occur. Therefore, there is room for improvement regarding the content of the traveling mode according to the connection state or the disconnection state between the second motor generator and the power transmission path.

The invention provides a control device for a vehicle capable of traveling in various traveling modes according to the connection state or the disconnection state between the second rotary machine and the power transmission path.

A control device for a vehicle according to an aspect of the invention includes an ECU. The vehicle includes an engine, a first rotary machine, a second rotary machine, a power transmission device, a battery, a first clutch, a second clutch. The power transmission device includes a first rotary element connected to a rotation shaft of the engine, a second rotary element connected to a rotation shaft of the first rotary machine; and a third rotary element connected to a driving wheel of the vehicle via a power transmission shaft. The power transmission device is configured to transmit a reaction force of output torque of the engine to the first rotary machine. The battery is configured to transmit and receive electric power to and from the first rotary machine and the second rotary machine. The first clutch is configured to selectively connect the second rotary machine to the power transmission shaft on the driving wheel side. The second clutch is a one-way clutch. The second clutch is configured to connect the second rotary machine and the power transmission shaft only when the rotation of the second rotary machine is synchronized with the rotation of the power transmission shaft. The second clutch is arranged in parallel to the first clutch on a power transmission path between the second rotary machine and the power transmission shaft. The ECU is configured to select a traveling mode of the vehicle from a plurality of traveling modes based on vehicle speed and required drive force for the driving wheel. The ECU includes a first traveling mode. The first traveling mode includes a second traveling mode, a third traveling mode, and a fourth traveling mode. The first traveling mode is a traveling mode in which the first clutch and the second clutch separate the connection of the second rotary machine and the power transmission shaft. The second traveling mode is a traveling mode in which the second rotary machine is rested while charging the battery with power by regenerative drive of the first rotary machine. The third traveling mode is a traveling mode in which the second rotary machine is rotated at a lower speed than a rotation speed of the third rotary element while discharging the battery by powering drive of the first rotary machine. The fourth traveling mode is a traveling mode in which the second rotary machine is rested while discharging the battery by powering drive of the first rotary machine. The ECU is configured to control the connection of the second rotary machine and the power transmission shaft by the first clutch. The ECU is configured to select the second traveling mode when the vehicle speed is in a low vehicle speed range equal to or lower than a predetermined vehicle speed when the ECU selects the first traveling mode, select the third traveling mode when the vehicle speed is in a high vehicle speed range equal to or higher than the predetermined vehicle speed, and select the fourth traveling mode when the vehicle speed is in a vehicle speed range between the low vehicle speed range and the high vehicle speed range.

In the control device according to the above aspect, the ECU may include a fifth traveling mode. The fifth traveling mode may include a sixth traveling mode and a seventh traveling mode. The fifth traveling mode may be a traveling mode in which the second rotary machine is connected to the power transmission shaft. The sixth traveling mode may be a traveling mode in which the vehicle travels only with power of the engine or with power of the engine and the second rotary machine. The seventh traveling mode may be a traveling mode in which the vehicle travels with power of the second rotary machine. The ECU may be configured to select a traveling mode from the traveling modes included in the fifth traveling mode and the first traveling mode based on a SOC of the battery when a selection area of a traveling mode based on the vehicle speed and the required drive force is an area where both the fifth traveling mode and the first traveling mode are selectable.

In the control device according to the above aspect, the ECU may be configured to perform switching from the first traveling mode to the fifth traveling mode with an increase in the SOC. The ECU may be configured to perform switching from the fifth traveling mode to the first traveling mode with a decrease in the SOC. A threshold value of the SOC for determining the switching from the first traveling mode to the fifth traveling mode may be greater than a threshold value of the SOC for determining the switching from the fifth traveling mode to the first traveling mode.

In the control device according to the above aspect, the ECU may be configured to perform switching from the fifth traveling mode to the first traveling mode with an increase in the SOC. The ECU may be configured to perform switching from the first traveling mode to the fifth traveling mode with a decrease in the SOC. A threshold value of the SOC for determining the switching from the first traveling mode to the fifth traveling mode may be smaller than a threshold value of the SOC for determining the switching from the fifth traveling mode to the first traveling mode.

In the control device according to the above aspect, the ECU may include a fifth traveling mode. The fifth traveling mode may include a sixth traveling mode and a seventh traveling mode. The fifth traveling mode may be a traveling mode in which the second rotary machine is connected to the power transmission shaft. The sixth traveling mode may be a traveling mode in which the vehicle travels only with power of the engine or with power of the engine and the second rotary machine. The seventh traveling mode may be a traveling mode in which the vehicle travels with power of the second rotary machine. The ECU may be configured to maintain the current sixth traveling mode until a predetermined time elapses when a selection area of a traveling mode is shifted to an area where the first traveling mode is selectable from the sixth traveling mode according to a brake-on operation of a driver and the brake-on operation is continued, and thereafter, to select a traveling mode to be applied from traveling modes of an area where the first traveling mode is selectable.

In the control device according to the above aspect, the ECU may be configured to maintain the current sixth traveling mode until a predetermined time elapses when a selection area of a traveling mode is shifted to an area where the first traveling mode is selectable from the sixth traveling mode according to a brake-on operation of a driver and the brake-on operation is continued, and thereafter, to select a traveling mode to be applied from traveling modes of an area where the first traveling mode is selectable.

In the control device according to the above aspect, the ECU may be configured to perform switching to the first traveling mode immediately after the ECU determines that the first traveling mode is applicable based on the SOC when a selection area of a traveling mode is shifted to an area where the first traveling mode is selectable from the sixth traveling mode with a decrease in the required drive force.

In the control device according to the above aspect, the ECU may include a fifth traveling mode. The fifth traveling mode may include a sixth traveling mode. The fifth traveling mode may be a traveling mode in which the second rotary machine is connected to the power transmission shaft. The sixth traveling mode may be a traveling mode in which the vehicle travels only with power of the engine or with power of the engine and the second rotary machine. The ECU may be configured to maintain the sixth traveling mode until a predetermined time elapses when switching from the first traveling mode to the sixth traveling mode is performed with an increase in the required drive force even when a selection area of a traveling mode is changed from the sixth traveling mode to the first traveling mode until the predetermined time elapses after the switching is performed.

In the control device according to the above aspect, the ECU may be configured to maintain the sixth traveling mode until a predetermined time elapses when switching from the first traveling mode to the sixth traveling mode is performed with an increase in the required drive force even when a selection area of a traveling mode is changed from the sixth traveling mode to the first traveling mode until the predetermined time elapses after the switching is performed.

The control device for a vehicle according to the above aspect can select the second traveling mode, the third traveling mode, and the fourth traveling mode according to the vehicle speed in the first traveling mode in which the second rotary machine is separated from the power transmission shaft. For this reason, the control device for a vehicle enables traveling with low loss by separation of the second rotary machine from the power transmission shaft and can appropriately perform charging or discharging of the battery. The control device for a vehicle achieves further reduction in loss during resting of the second rotary machine. In regard to a traveling mode, when an operation of a driver with a high frequency of change, such as change in accelerator opening, is performed, switching control is frequently operated. However, the control device for a vehicle can select the second traveling mode, the third traveling mode, and the fourth traveling mode according to the vehicle speed. Therefore, it is possible to suppress frequent switching of a traveling mode due to the operation of the driver.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
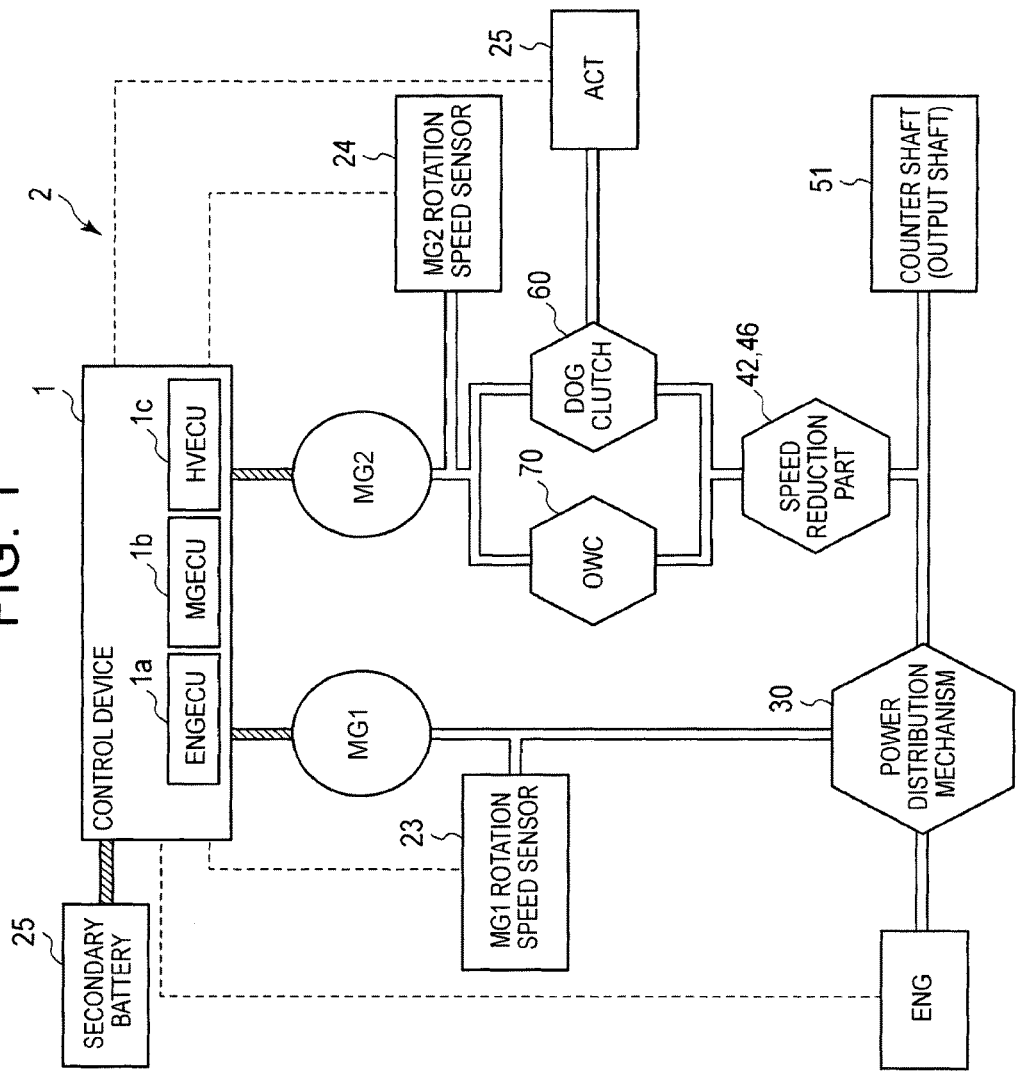
FIG. 1 is a diagram showing an example of a hybrid system to which a control device for a vehicle according to the invention is applied.

Hereinafter, an example of a control device for a vehicle according to the invention will be described in detail referring to the drawings. It should be noted that the invention is not limited to the example.

EXAMPLE

An example of a control device for a vehicle according to the invention will be described referring to FIGS. 1 to 16.

Figure 2:
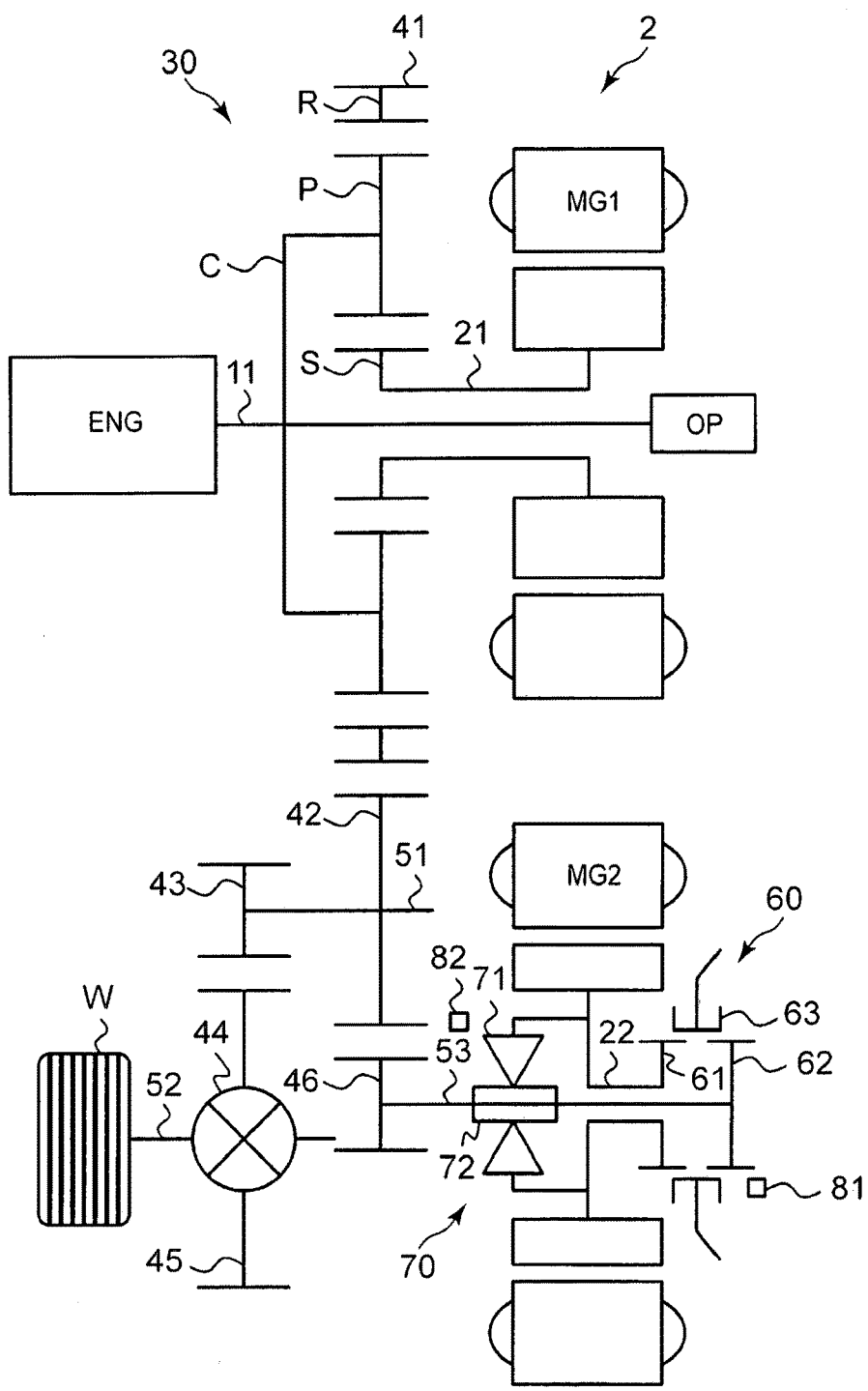
FIG. 2 is a diagram showing the specific configuration of a hybrid system of an example.

A vehicle described in this example is a hybrid vehicle which is provided with an engine ENG, a first rotary machine MG1, and a second rotary machine MG2 as a power source. Reference numeral 1 of FIG. 1 represents a control device for the hybrid vehicle. Reference numeral 2 of FIGS. 1 and 2 represents a hybrid system which is mounted in the hybrid vehicle.

A control device 1 of this example is provided with an electronic control device (hereinafter, referred to as "ENGECU") 1a which functions as an engine control device configured to control the operation of the engine ENG, an electronic control device (hereinafter, referred to as "MGECU") 1b which functions as a rotary machine control device configured to control the operations of the first rotary machine MG1 and the second rotary machine MG2, and an electronic control device (hereinafter, referred to as "HVECU") 1c which functions as an integrated control device configured to perform integrated control of the ENGECU 1a and the MGECU 1b and integrated control of the hybrid system 2.

The engine ENG is an engine, such as an internal combustion engine or an external combustion engine, which outputs mechanical power (output torque) from an engine rotation shaft (crankshaft) 11. An engine control unit of the ENGECU 1a performs, for example, opening control of an electronic throttle valve, ignition control by output of an ignition signal, injection control of fuel, and the like to control output torque (hereinafter, referred to as "engine torque") Te of the engine ENG.

The first rotary machine MG1 and the second rotary machine MG2 are an electric motor generator which has a function as an electric motor at the time of powering drive and a function as a generator at the time of regenerative drive. The first and second rotary machines MG1, MG2 can transmit and receive electric power to and from a secondary battery 25. That is, the first and second rotary machines MG1, MG2 can convert mechanical energy (rotational torque) input to the rotation shafts (MG1 rotation shaft 21, MG2 rotation shaft 22) to electric energy and can store electric energy in the secondary battery 25 through an inverter (not shown). The first and second rotary machines MG1, MG2 may convert electric energy supplied from the secondary battery 25 to mechanical energy (rotational torque) and may output mechanical energy from the rotation shafts (MG1 rotation shaft 21, MG2 rotation shaft 22) as mechanical power (output torque). The first and second rotary machines MG1, MG2 may convert electric energy generated by the other rotary machine (second and first rotary machines MG2, MG1) to mechanical energy. A rotary machine control unit of the MGECU 1b adjusts, for example, current values supplied to the first rotary machine MG1 and the second rotary machine MG2 or an inverter carrier frequency, and controls the rotation speed (hereinafter, referred to as "MG1 rotation speed") Nmg1 and output torque (hereinafter, referred to as "MG1 torque") Tmg1 of the first rotary machine MG1 and the rotation speed (hereinafter, referred to as "MG2 rotation speed") Nmg2 and output torque (hereinafter, referred to as "MG2 torque") Tmg2 of the second rotary machine MG2.

The MG1 rotation speed Nmg1 is detected by an MG1 rotation speed sensor 23. The MG2 rotation speed Nmg2 is detected by an MG2 rotation speed sensor 24. The MG1 rotation speed sensor 23 and the MG2 rotation speed sensor 24 are, for example, resolvers, and are connected to the MGECU 1b.

As shown in FIG. 2, the hybrid system 2 is a double-shaft type in which the engine rotation shaft 11 and the MG1 rotation shaft 21 are arranged concentrically and the MG2 rotation shaft 22 is arranged in parallel to the engine rotation shaft 11 and the MG1 rotation shaft 21 at an interval. The hybrid system 2 is configured to enable power transmission between the respective power sources and power transmission between each power source and a driving wheel W. For this reason, the hybrid system 2 is provided with a power distribution mechanism 30 connected to the engine ENG, the first rotary machine MG1, and the second rotary machine MG2.

The power distribution mechanism 30 is a differential device which is provided with a plurality of rotary elements differentially rotatable, and in which the engine rotation shaft 11, the MG1 rotation shaft 21, the MG2 rotation shaft 22, and the driving wheel W are separately connected to the rotary elements. For example, as the power distribution mechanism 30, a planetary gear mechanism having a plurality of rotary elements differentially rotatable is used. As the planetary gear mechanism, in addition to a single pinion type having a sun gear S, a ring gear R, a plurality of pinion gears P, and a carrier C shown in FIG. 2, a double pinion type, a Ravigneaux type, or the like can be applied. In this illustration, the engine rotation shaft 11 and the carrier C as a first rotary element are coupled so as to be rotatable integrally, and the MG1 rotation shaft 21 and the sun gear S as a second rotary element are coupled so as to be rotatable integrally. The MG2 rotation shaft 22 is coupled to the ring gear R as a third rotary element through the following gear group or the like.

An oil pump OP is connected to the engine rotation shaft 11 and the carrier C. The oil pump OP is driven using the rotation of the engine ENG, and ejects hydraulic oil for lubricating or cooling the first rotary machine MG1 or the second rotary machine MG2, the power distribution mechanism 30, and the like.

The ring gear R of the internal gear operates as an output part of engine torque Te or MG1 torque Tmg1 to the driving wheel W side. For this reason, in the ring gear R, an external gear as a counter drive gear 41 is formed. The counter drive gear 41 is in mesh with a counter driven gear 42 having a rotation shaft (counter shaft 51) displaced in parallel. Therefore, engine torque Te or MG1 torque Tmg1 is transmitted to the counter driven gear 42.

The counter driven gear 42 is fixed onto the axis of the counter shaft 51. A drive pinion gear 43 is fixed onto the axis of the counter shaft 51. The counter driven gear 42 and the drive pinion gear 43 are rotatable integrally through the counter shaft 51. The drive pinion gear 43 is in mesh with a differential ring gear 45 of a differential device 44. The differential device 44 is coupled to the driving wheels W through a right axle (drive shaft) 52 and a left axle (drive shaft) 52.

The counter driven gear 42 is in mesh with a reduction gear 46 having a rotation shaft displaced in parallel. The reduction gear 46 is fixed onto the axis of a reduction shaft 53. The reduction gear 46 has a diameter smaller than the counter driven gear 42, reduces the rotation of the reduction shaft 53, and transmits the reduced rotation of the reduction shaft 53 to the counter driven gear 42. That is, in the hybrid system 2, a speed reduction part is constituted by the counter driven gear 42 and the reduction gear 46. The MG2 rotation shaft 22 is coupled to the reduction shaft 53 through a controllable power connection/disconnection device and a control-unnecessary power connection/disconnection device described below. For this reason, the second rotary machine MG2 (MG2 rotation shaft 22) is coupled to the ring gear R and the driving wheel W through the controllable power connection/disconnection device and the control-unnecessary power connection/disconnection device. MG2 torque Tmg2 is transmitted to the counter driven gear 42 through the reduction gear 46. In the hybrid system 2, the controllable power connection/disconnection device and the control-unnecessary power connection/disconnection device become a separation part which separates the second rotary machine MG2 from the reduction shaft 53 in an MG2 rest mode (first traveling mode) described below.

In this way, engine torque Te, MG1 torque Tmg1, and MG2 torque Tmg2 are transmitted to the counter shaft 51 to which the counter driven gear 42 is fixed. For this reason, engine torque Te and the like are transmitted to the driving wheel W side through the counter shaft 51. That is, the counter shaft 51 operates as an output shaft of the hybrid system 2.

The second rotary machine MG2 and the reduction gear 46 are arranged concentrically. The controllable power connection/disconnection device and the control-unnecessary power connection/disconnection device are arranged in parallel between the second rotary machine MG2 and the reduction gear 46. That is, in the hybrid system 2, the controllable power connection/disconnection device and the control-unnecessary power connection/disconnection device are arranged in parallel on a power transmission path between the second rotary machine MG2 and the power transmission shaft (reduction shaft 53) on the driving wheel W side when viewed from the second rotary machine MG2 side. In the hybrid system 2, the controllable power connection/disconnection device and the control-unnecessary power connection/disconnection device are provided to connect the MG2 rotation shaft 22 to the reduction shaft 53 or to disconnect the MG2 rotation shaft 22 from the reduction shaft 53. That is, the controllable power connection/disconnection device and the control-unnecessary power connection/disconnection device are provided to connect the second rotary machine MG2 to a power transmission path (a power transmission path with the ring gear R and a power transmission path with the driving wheel W) or to separate the second rotary machine MG2 from the power transmission path.

The controllable power connection/disconnection device (first clutch) includes a hydraulically driven or electrically driven actuator (ACT) 65, and the actuator is controlled by the MGECU 1*b*, whereby connection/disconnection of power transmission is arbitrarily executed. For example, as the power connection/disconnection device, an engagement device in which an engagement operation or a release operation between two engagement elements is controlled by the MGECU 1*b*, and connection/disconnection of power transmission between the engagement elements is arbitrarily executable can be used. Specifically, a control clutch, such as a gearing type engagement device (dog clutch) or a friction engagement device (friction clutch), is used as the power connection/disconnection device. In this illustration, a dog clutch 60 is used. The dog clutch 60 of this illustration is provided with a first engagement element 61, a second engagement element 62, and a third engagement element 63. The first engagement element 61 is coupled to the MG2 rotation shaft 22 so as to be rotatable integrally. The second engagement element 62 is coupled to the reduction shaft 53 so as to be rotatable integrally. The third engagement element 63 is moved so as to be engaged with both the first engagement element 61 and the second engagement element 62 during the engagement operation, thereby integrally rotating the first engagement element 61 and the second engagement element 62. During the release operation, the third engagement element 63 is moved so as to be not engaged with both the first engagement element 61 and the second engagement element 62, thereby blocking transmission of torque therebetween. A power connection/disconnection control unit (clutch control unit) of the MGECU 1*b* controls the actuator 65 shown in FIG. 1, and moves the third engagement element 63 to engage or release the dog clutch 60. The dog clutch 60 may be provided with the first engagement element 61, the second engagement element 62, and the actuator 65, the actuator 65 may move the first engagement element 61 or the second engagement element 62 toward the other engagement element to engage the dog clutch 60, and the actuator 65 may separate the first engagement element 61 or the second engagement element 62 from the other engagement element to release the dog clutch 60. Determination of whether the dog clutch 60 is in the engagement state or the release state can be performed, for example, using a position sensor 81 capable of detecting the position of the third engagement element 63.

The control-unnecessary power connection/disconnection device can connect/disconnect power transmission even if control by the power connection/disconnection control unit (clutch control unit) of the MGECU 1*b* is not executed. For example, as the power connection/disconnection device (second clutch), an engagement device (for example, a control-less clutch) in which an engagement operation or a release operation between two engagement elements is performed according to an operation of a member connected to at least one engagement element can be used. Specifically, a one-way clutch (OWC) 70 which transmits power only in one direction is used. The one-way clutch 70 is provided with a first engagement element 71 which is coupled to the MG2 rotation shaft 22 so as to be rotatable integrally, and a second engagement element 72 which is coupled to the reduction shaft 53 so as to be rotatable integrally.

The one-way clutch 70 increases the rotation of the second rotary machine MG2 in the forward direction, only when the rotation of the first engagement element 71 in the forward direction of the vehicle is synchronized with the rotation of the second engagement element 72, the first engagement element 71 and the second engagement element 72 are engaged, and power transmission therebetween is possible. For example, the MG2 rotation shaft 22 and the reduction shaft 53 are rotating in the same direction during forward traveling, and when an actual MG2 rotation speed (the actual rotation speed of the MG2 rotation shaft 22) is lower than the rotation speed of the reduction shaft 53 or when the reduction shaft 53 is rotating during forward traveling in a state where the actual MG2 rotation speed is zero, the first engagement element 71 and the second engagement element 72 are idled and the one-way clutch 70 is put in the release state. In the release state, the one-way clutch 70 increases the actual MG2 rotation speed in the same rotation direction as the reduction shaft 53, and synchronizes the actual MG2 rotation speed with the rotation speed of the reduction shaft 53, whereby the first engagement element 71 is engaged with the second engagement element 72. During stopping (when the actual MG2 rotation speed and the rotation speed of the reduction shaft 53 are zero), the one-way clutch 70 increase the actual MG2 rotation speed in the same rotation direction as the reduction shaft 53 during forward traveling, whereby the first engagement element 71 is engaged with the second engagement element 72. The one-way clutch 70 is put in the release state when the rotation direction of the second rotary machine MG2 is reversed to forward traveling (during backward traveling). Determination of whether the one-way clutch 70 is in the engagement state or the release state can be performed, for example, using a position sensor 82 capable of detecting the position of the first engagement element 71 or the second engagement element 72. The position sensor 82 detects a movable position in the first engagement element 71 and the second engagement element 72.

When the dog clutch 60 is engaged, torque transmission between the MG2 rotation shaft 22 and the reduction shaft 53 is possible regardless of whether or not the one-way clutch 70 is engaged. For this reason, when the dog clutch 60 is engaged to rotate the MG2 rotation shaft 22 in the same rotation direction as the reduction shaft 53 during forward traveling, the hybrid vehicle can be moved forward by MG2 torque Tmg2. When the MG2 rotation shaft 22 is reversed to this state, the hybrid vehicle can be moved backward by MG2 torque Tmg2.

In the hybrid system 2, as a traveling mode, a hybrid (HV) traveling mode (sixth traveling mode) and an electric vehicle (EV) traveling mode (seventh traveling mode) are set. Also, in the hybrid system 2, as a traveling mode, a traveling mode (hereinafter, referred to as "MG2 separation traveling mode (first traveling mode)") in which the second rotary machine MG2 is separated from the power transmission path is set. In the hybrid system 2, it is possible to allow the hybrid vehicle to travel in any traveling mode. As a traveling mode against the MG2 separation traveling mode, there is a traveling mode (hereinafter, referred to as "MG2 connection traveling mode (fifth traveling mode)") in which the second rotary machine MG2 is connected to the power transmission path. The MG2 connection traveling mode is a hybrid mode or an EV traveling mode described below in the HV traveling mode.

A traveling control unit of the HVECU 1c calculates a command value of engine torque Te, a command value of MG1 torque Tmg1, and a command value of MG2 torque Tmg2 according to the traveling mode, and calculates a command value of an engine speed Ne, a command value of the MG1 rotation speed Nmg1, and a command value of the MG2 rotation speed Nmg2. The respective command values regarding the engine ENG, the first rotary machine MG1, and the second rotary machine MG2 are calculated based on the required drive force generated by the driving wheel W, the vehicle speed, or the like. The traveling control unit transmits the command values of engine torque Te and the engine speed Ne to the ENGECU 1a to control the engine ENG. Also, the traveling control unit transmits the command values of MG1 torque Tmg1 and the MG1 rotation speed Nmg1 and the command values of MG2 torque Tmg2 and the MG2 rotation speed Nmg2 to the MGECU 1b to control the first rotary machine MG1 and the second rotary machine MG2. If information of a traveling mode to be controlled is received from the traveling control unit, the power connection/disconnection control unit (clutch control unit) of the MGECU 1b engages or releases the dog clutch 60 according to the traveling mode.

Figure 3:
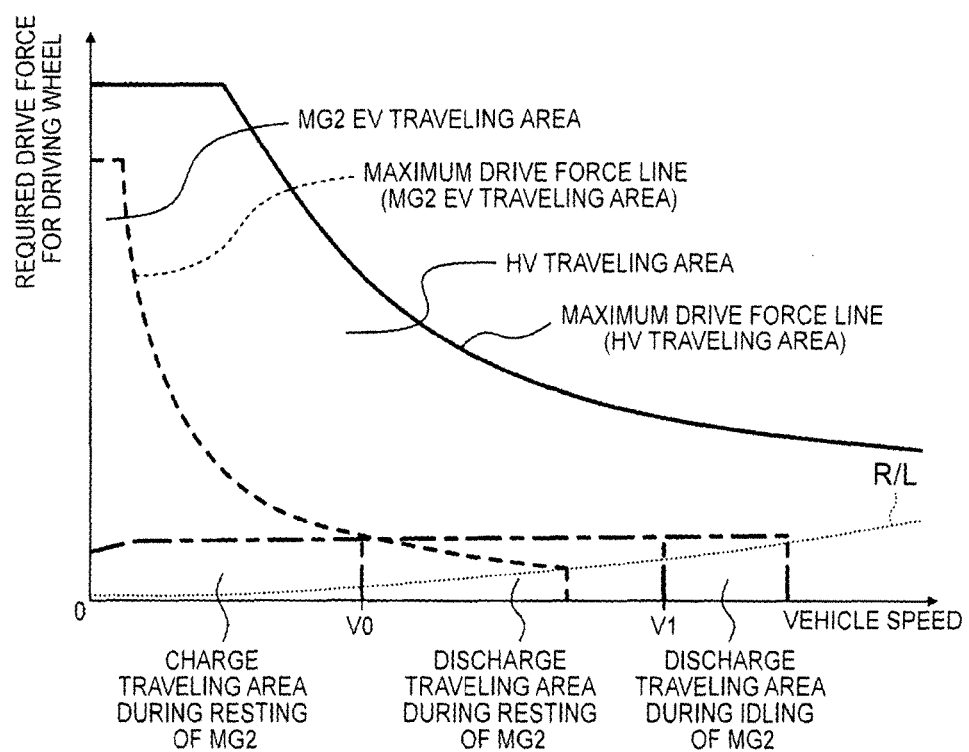
FIG. 3 is a diagram showing a selection area of a traveling mode.
Figure 4:
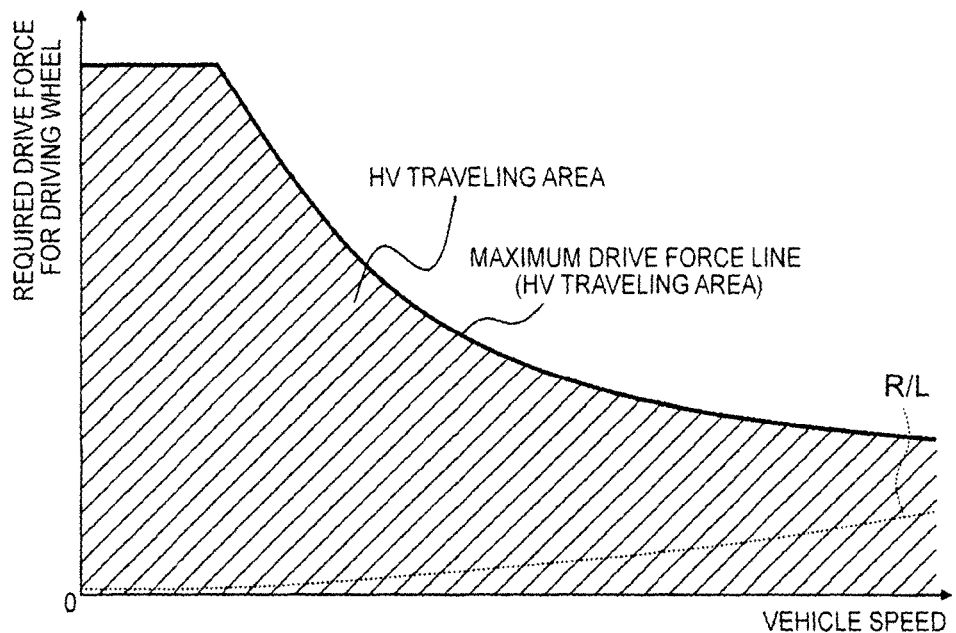
FIG. 4 is a diagram showing an HV traveling area.

The HV traveling mode is a traveling mode using engine torque Te. As the HV traveling mode, a hybrid mode in which the vehicle travels using engine torque Te and MG2 torque Tmg2, and an engine direct transmission mode in which the vehicle travels only using engine torque Te are provided. An available area (hereinafter, referred to as "HV traveling area") according to the vehicle speed and the required drive force for the driving wheel W in the HV traveling mode is an area divided by a line (maximum drive force line) of maximum drive force for each vehicle speed to be output from the driving wheel W in the HV traveling mode (FIGS. 3 and 4). The HV traveling area is the widest area in the hybrid system 2.

In the hybrid mode, the first rotary machine MG1 bears a reaction force of engine torque Te. In the hybrid mode, the clutch control unit of the MGECU 1b engages the dog clutch 60 and connects the second rotary machine MG2 to the power transmission path. In the hybrid mode, when the vehicle reduces speed, the second rotary machine MG2 can be regeneratively driven. In the hybrid mode, the first rotary machine MG1 may be regeneratively driven. When the hybrid mode is selected, the traveling control unit considers whether or not to regeneratively drive the first rotary machine MG1, and then, calculates the command values regarding the engine ENG, the first rotary machine MG1, and the second rotary machine MG2.

In the engine direct transmission mode, engine torque Te is mechanically transmitted to the counter shaft 51 (that is, the driving wheel W) without passing through an electric path. In the engine direct transmission mode, the clutch control unit releases the dog clutch 60, whereby the one-way clutch 70 is in the release state, the MG2 rotation shaft 22 is disconnected from the reduction shaft 53, and the second rotary machine MG2 is separated from the power transmission path. For this reason, in the engine direct transmission mode, the rotary machine control unit rests the second rotary machine MG2, and eliminates dragging loss of the second rotary machine MG2 during traveling, thereby improving fuel efficiency. In the engine direct transmission mode of this illustration, a rest mode (hereinafter, referred to as "MG2 rest mode") of the second rotary machine MG2 is used together.

The EV traveling mode is a traveling mode only using MG2 torque Tmg2. For this reason, in the EV traveling mode, the clutch control unit engages the dog clutch 60 and connects the second rotary machine MG2 to the power transmission path. In the following description, the EV traveling mode is referred to as "MG2 EV traveling mode". In the MG2 EV traveling mode, the engine ENG can be stopped for improvement of fuel efficiency. The traveling control unit considers whether or not to stop the engine ENG, and then, calculates the command values regarding the engine ENG, the first rotary machine MG1, and the second rotary machine MG2.

Figure 5:
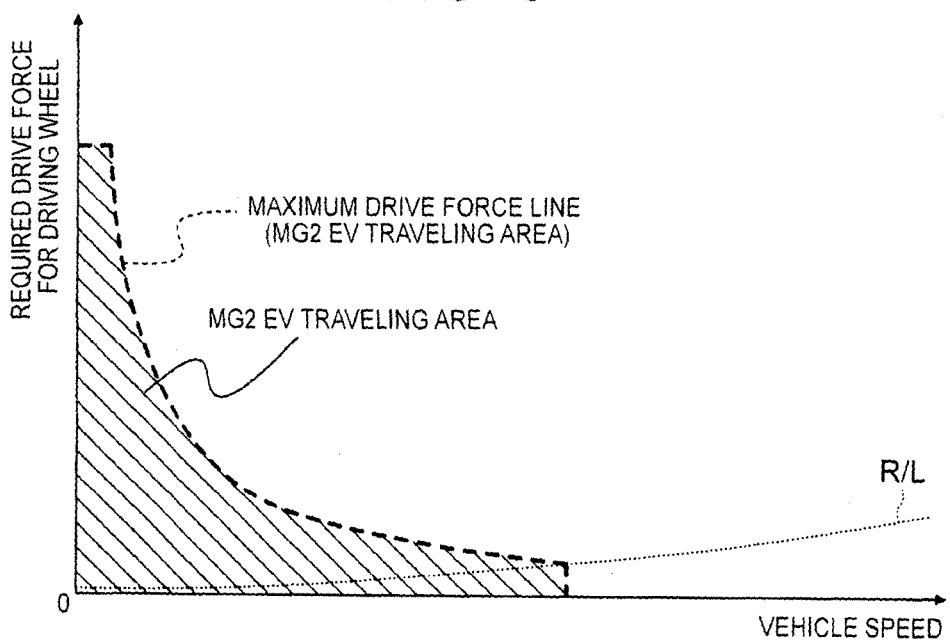
FIG. 5 is a diagram showing an MG2 EV traveling area.

An available area (hereinafter, referred to as "MG2 EV traveling area") according to the vehicle speed and the required drive force for the driving wheel W in the MG2 EV traveling mode is an area divided by a line (maximum drive force line) of maximum drive force for each vehicle speed to be output from the driving wheel W in the MG2 EV traveling mode (FIGS. 3 and 5). The maximum drive force is smaller than the maximum drive force in the HV traveling mode at the same vehicle speed. In the MG2 EV traveling area, the available area overlaps a part of the HV traveling area (FIGS. 3 to 5). For this reason, in the overlap area, the MG2 EV traveling mode or the HV traveling mode can be selected.

Figure 6:
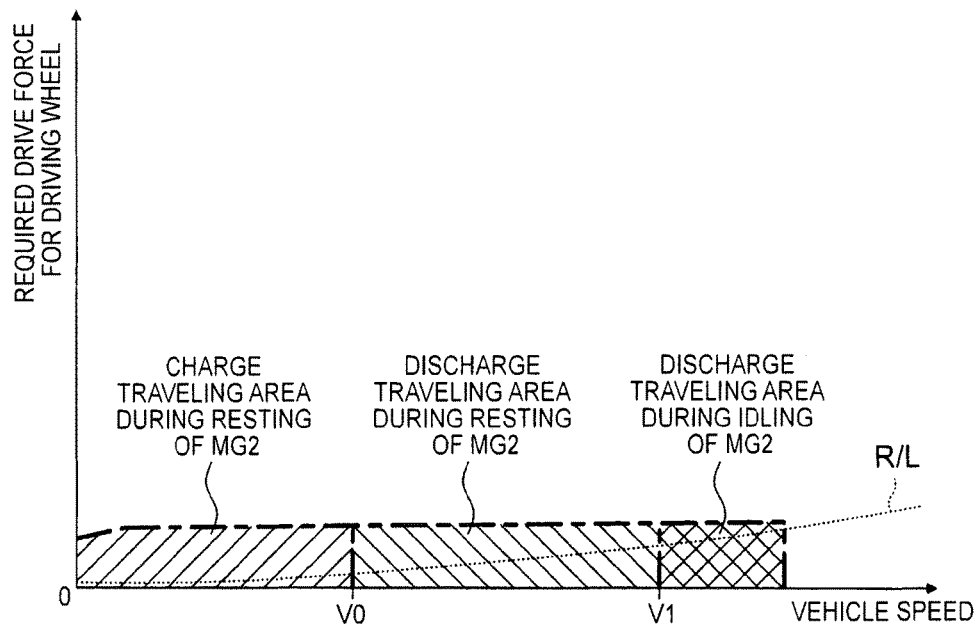
FIG. 6 is a diagram showing a charge traveling area during resting of MG2, a discharge traveling area during resting of MG2, and a discharge traveling area during idling of MG2.

The MG2 separation traveling mode is a traveling mode in which the second rotary machine MG2 is separated from the reduction shaft 53 in the disconnection state of the first engagement element 61 and the second engagement element 62 of the dog clutch 60. Specifically, the MG2 separation traveling mode is a traveling mode in which the one-way clutch 70 is released in a state where the dog clutch 60 is released. The MG2 separation traveling mode is used in an area where the required drive force for the driving wheel W is small (FIGS. 3 and 6). The area where the required drive force for the driving wheel W is small is an area equal to the traveling load resistance in the hybrid vehicle. That is, the MG2 separation traveling mode is used when the required drive force for the driving wheel W has magnitude equal to as the traveling load resistance. The traveling load resistance is indicated in FIGS. 3 and 6 as a road load line (R/L line) representing the traveling load resistance for each vehicle speed.

Figure 7:
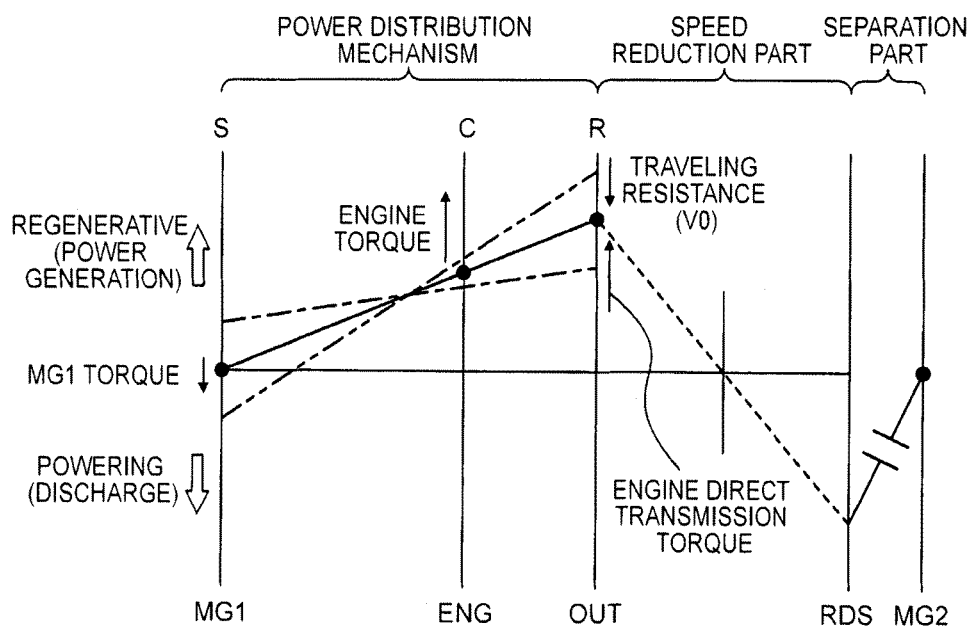
FIG. 7 is a collinear diagram in an MG2 separation traveling mode.

In the MG2 separation traveling mode, the vehicle travels using engine torque Te. In the MG2 separation traveling mode, the first rotary machine MG1 bears the reaction force of engine torque Te. FIG. 7 is a collinear diagram in the MG2 separation traveling mode. In FIG. 7, "RDS" indicates the reduction shaft 53. Also, "OUT" indicates the output shaft (counter shaft 51) connected to the ring gear R. When focusing on the first rotary machine MG1 at this time, the rotation direction of the first rotary machine MG1 is reversed with a predetermined vehicle speed V0 as a boundary. For this reason, in the MG2 separation traveling mode, the first rotary machine MG1 is switched between powering drive and regenerative drive with the predetermined vehicle speed V0 as a boundary. The first rotary machine MG1 of this illustration is regeneratively driven in a low vehicle speed range from stopping (vehicle speed 0) to the predetermined vehicle speed V0, and is powering-driven in a middle vehicle speed range or a high vehicle speed range equal to or higher than the predetermined vehicle speed V0. Therefore, the MG2 separation traveling mode can be roughly divided into two traveling modes with the predetermined vehicle speed V0 as a boundary. The predetermined vehicle speed V0 is necessarily determined by the configuration (the power distribution mechanism 30, the gear ratio of the speed reduction part, or the like) of the hybrid system 2.

In the MG2 separation traveling mode of the low vehicle speed range, the secondary battery 25 is charged with electric power generated by regenerative drive of the first rotary machine MG1. That is, in the MG2 separation traveling mode of the low vehicle speed range, the second rotary machine MG2 is separated from the power transmission path, and in this state, the secondary battery 25 is charged with electric power obtained by regenerative drive of the first rotary machine MG1.

Specifically, in the MG2 separation traveling mode of the low vehicle speed range, the clutch control unit releases the dog clutch 60, whereby the one-way clutch 70 is released, and the second rotary machine MG2 is separated from the power transmission path. The rotary machine control unit controls MG1 torque Tmg1 so as to bear the reaction force of engine torque Te. With this, the first rotary machine MG1 is regeneratively driven to generate electric power.

In the MG2 separation traveling mode of the low vehicle speed range, the rotary machine control unit controls the second rotary machine MG2 in the MG2 rest mode, thereby improving fuel efficiency. For this reason, in the following description, the MG2 separation traveling mode of the low vehicle speed range is referred to as "MG2 charge traveling mode during resting of MG2 (second traveling mode)".

As described above, an area (hereinafter, referred to as "charge traveling area during resting of MG2") according to the vehicle speed and the required drive force for the driving wheel W, to which the charge traveling mode during resting of MG2 is applied, is an area where the vehicle speed is in the low vehicle speed range and the required drive force for the driving wheel W is small. Therefore, when the vehicle speed is in the low vehicle speed range and the required drive force for the driving wheel W is small (when the required drive force for the driving wheel W has magnitude equal to the traveling load resistance), the traveling control unit can select the charge traveling mode during resting of MG2.

Figure 8:
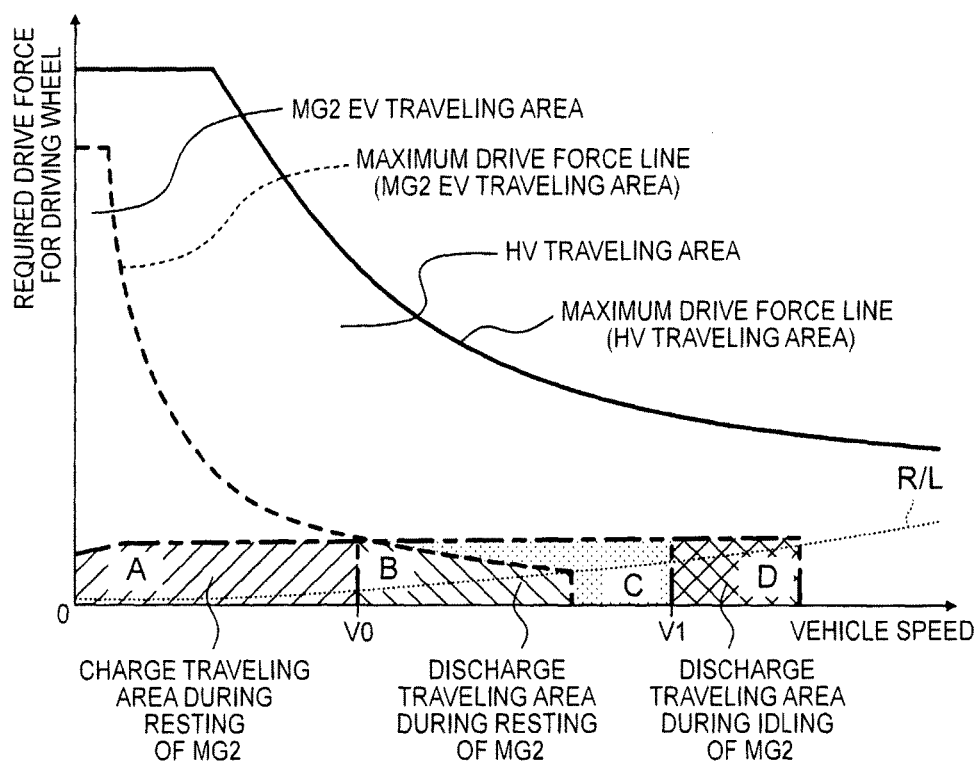
FIG. 8 is a diagram showing first to fourth overlap areas.

The charge traveling area during resting of MG2 overlaps a part of the HV traveling area and a part of the MG2 EV traveling area (FIG. 8). For this reason, in the overlap area (hereinafter, referred to as "first overlap area") A, the traveling control unit can select the HV traveling mode, the MG2 EV traveling mode, or the charge traveling mode during resting of MG2 based on the vehicle speed and the required drive force for the driving wheel W. Therefore, the traveling control unit determines a traveling mode to be applied from among various selectable traveling modes based on the state of charge (SOC) of the secondary battery 25.

Next, the MG2 separation traveling mode in the middle vehicle speed range or the high vehicle speed range will be described. In the MG2 separation traveling mode of this vehicle speed range, like the charge traveling mode during resting of MG2, the second rotary machine MG2 is separated from the power transmission path by release control of the clutch control unit to the dog clutch 60. The rotary machine control unit controls MG1 torque Tmg1 so as to bear the reaction force of engine torque Te. With this, the first rotary machine MG1 is powering-driven to consume electric power. In this illustration, electric power supplied to the first rotary machine MG1 at this time is provided from the secondary battery 25. For this reason, in the MG2 separation traveling mode, electric power of the secondary battery 25 can be discharged.

In the MG2 separation traveling mode of the middle vehicle speed range or the high vehicle speed range, the MG2 rest mode can be applied. In the MG2 rest mode, there is the rotation speed difference between the MG2 rotation speed Nmg2 and the rotation speed of the reduction shaft 53. For this reason, at the time of switching from the MG2 separation traveling mode to the HV traveling mode or the MG2 EV traveling mode, the clutch control unit causes the rotary machine control unit to increase the MG2 rotation speed Nmg2 to the rotation speed of the reduction shaft 53 to synchronize the rotations of the first engagement element 61 and the second engagement element 62 of the dog clutch 60, and performs engagement control of the dog clutch 60. However, the rotation speed difference increases when the vehicle speed increases. Accordingly, at the time of switching of the traveling mode, the higher the vehicle speed is, the more it takes time to synchronize the rotations, and output responsiveness of MG2 torque Tmg2 is degraded. Therefore, drivability may be deteriorated.

Accordingly, the MG2 separation traveling mode of the middle vehicle speed range or the high vehicle speed range is divided into an area where the vehicle speed is lower than a predetermined vehicle speed V1 and an area where the vehicle speed is equal to or higher than the predetermined vehicle speed V1. The area where the vehicle speed is lower than the predetermined vehicle speed V1 is an area where degradation of output responsiveness of MG2 torque Tmg2 does not cause deterioration of drivability even if the MG2 rest mode is applied. This area is used in the middle vehicle speed range. The area where the vehicle speed is equal to or higher than the predetermined vehicle speed V1 is an area where the application of the MG2 rest mode may cause degradation of output responsiveness of MG2 torque Tmg2 enough to cause deterioration of drivability. This area is used in the high vehicle speed range. Determination of whether or not drivability is deteriorated may be performed by, for example, a sensory evaluation experiment using an actual vehicle.

Accordingly, in the MG2 separation traveling mode of the middle vehicle speed range, the second rotary machine MG2 is separated from the power transmission path, and in this state, electric power of the secondary battery 25 is discharged by powering drive of the first rotary machine MG1, and the second rotary machine MG2 is rested. In the MG2 separation traveling mode of the high vehicle speed range, the second rotary machine MG2 is separated from the power transmission path, and in this state, electric power of the secondary battery 25 is discharged by powering drive of the first rotary machine MG1, and the second rotary machine MG2 is rotated at an idling rotation speed. In the following description, the MG2 separation traveling mode of the middle vehicle speed range is referred to as "discharge traveling mode during resting of MG2 (fourth traveling mode)", and the MG2 separation traveling mode of the high vehicle speed range is referred to as "discharge traveling mode during idling of MG2 (third traveling mode)".

In the discharge traveling mode during separation of MG2, it is possible to suppress deterioration of drivability while suppressing degradation of fuel efficiency by the MG2 rest mode.

As described above, an area (hereinafter, referred to as "discharge traveling area during resting of MG2") according to the vehicle speed and the required drive force for the driving wheel W, to which the discharge traveling mode during resting of MG2 is applied, is an area where the vehicle speed is in the middle vehicle speed range (an area where the vehicle speed is higher than that in the charge traveling area and is lower than in a discharge traveling area during idling of MG2 described below) and the required drive force for the driving wheel W is small. Therefore, when the vehicle speed is in the middle vehicle speed range and the required drive force for the driving wheel W is small (when the required drive force for the driving wheel W has magnitude equal to the traveling load resistance), the traveling control unit can select the discharge traveling mode during resting of MG2.

The discharge traveling area during resting of MG2 overlaps a part of the HV traveling area or a part of the MG2 EV traveling area (FIG. 8). In this illustration, there are a second overlap area B where a part of the HV traveling area, a part of the MG2 EV traveling area, and the discharge traveling area during resting of MG2 overlap one another, and a third overlap area C where a part of the HV traveling area and the discharge traveling area during resting of MG2 overlap each other. For this reason, in the second overlap area B, the traveling control unit can select the HV traveling mode, the MG2 EV traveling mode, or the discharge traveling mode during resting of MG2 based on the vehicle speed and the required drive force for the driving wheel W. Also, in the third overlap area C, the traveling control unit can select the HV traveling mode or the discharge traveling mode during resting of MG2 based on the vehicle speed and the required drive force for the driving wheel W. Therefore, in both the second overlap area B and the third overlap area C, the traveling control unit determines a traveling mode to be applied from among various selectable traveling modes based on the SOC of the secondary battery 25. For example, when the MG2 EV traveling area can be expanded toward a higher vehicle speed side with an increase in size of the second rotary machine MG2 or the like, the discharge traveling area during resting of MG2 may become only the second overlap area B which overlaps a part of the HV traveling area and a part of the MG2 EV traveling area.

Even if the vehicle speed and the required drive force for the driving wheel W are present in the second overlap area B or the third overlap area C, like the first overlap area A, the traveling control unit selects a traveling mode in the second overlap area B or the third overlap area C based on the SOC of the secondary battery 25.

In the discharge traveling mode during idling of MG2, the rotary machine control unit operates the second rotary machine MG2 without resting the second rotary machine MG2, whereby it is possible to suppress deterioration of drivability.

The idling rotation speed of the second rotary machine MG2 is the MG2 rotation speed Nmg2 at which the one-way clutch 70 can be maintained in the release state. In other words, the idling rotation speed is the MG2 rotation speed Nmg2 lower than the rotation speed of the reduction shaft 53. The reason for rotating the second rotary machine MG2 at the idling rotation speed is to decrease the rotation speed difference between the MG2 rotation speed Nmg2 and the rotation speed of the reduction shaft 53, thereby shortening the time required for synchronizing the rotations of the second rotary machine MG2 and the reduction shaft 53 and suppressing deterioration of drivability at the time of switching from the discharge traveling mode during idling of MG2 to the HV traveling mode. Therefore, it is desirable that the idling rotation speed is set to a rotation speed suppressed to be low by a predetermined rotation speed with respect to the rotation speed of the reduction shaft 53. The predetermined rotation speed is the rotation speed difference between the MG2 rotation speed Nmg2 and the rotation speed of the reduction shaft 53 which can obtain a synchronization time capable of suppressing deterioration of drivability. However, when the MG2 rotation speed Nmg2 is increased, electric power supplied to the second rotary machine MG2 increases, causing deterioration of fuel efficiency. For this reason, it is desirable that the predetermined rotation speed has magnitude not to cause significant deterioration of fuel efficiency.

As described above, an area (hereinafter, referred to as "discharge traveling area during idling of MG2") according to the vehicle speed and the required drive force for the driving wheel W, to which the discharge traveling mode during idling of MG2 is applied, is an area where the vehicle speed is in the high vehicle speed range (an area where the vehicle speed is higher than that in the discharge traveling area during resting of MG2) and the required drive force for the driving wheel W is small. Therefore, when the vehicle speed is the high vehicle speed range and the required drive force for the driving wheel W is small (when the required drive force for the driving wheel W has magnitude equal to the traveling load resistance), the traveling control unit can select the discharge traveling mode during idling of MG2.

The discharge traveling area during idling of MG2 overlaps a part of the HV traveling area (FIG. 8). For this reason, in a fourth overlap area D where the discharge traveling area during idling of MG2 overlaps a part of the HV traveling area, the traveling control unit can select the HV traveling mode or the discharge traveling mode during idling of MG2 based on the vehicle speed and the required drive force for the driving wheel W. Therefore, the traveling control unit determines a traveling mode to be applied from among various selectable traveling modes based on the SOC of the secondary battery 25. As described above, when the MG2 EV traveling area can be expanded toward a higher vehicle speed side, the discharge traveling area during idling of MG2 may overlap a part of the HV traveling area and a part of the MG2 EV traveling area.

Figure 9:
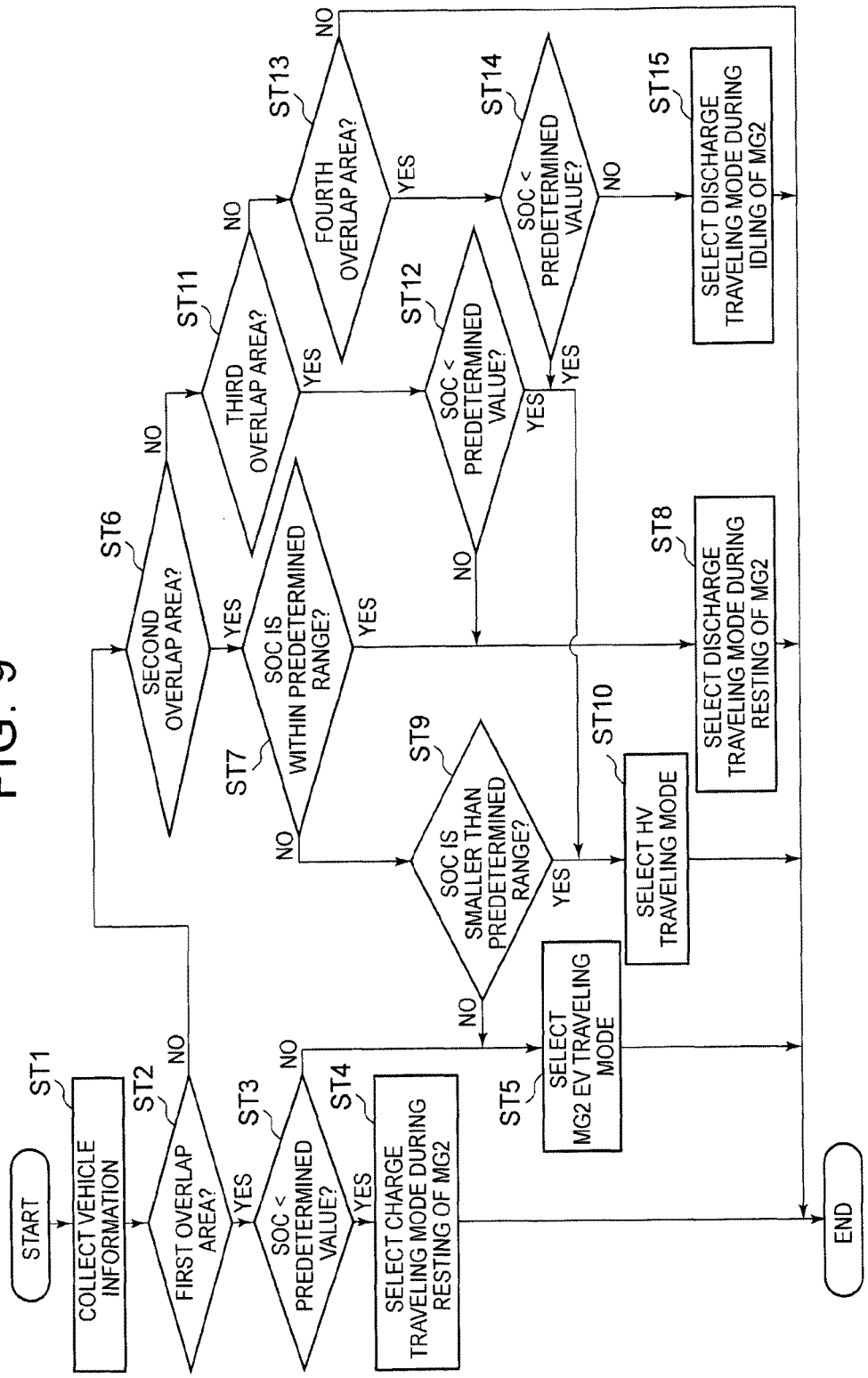
FIG. 9 is a flowchart illustrating selection of a traveling mode.
Figure 10:
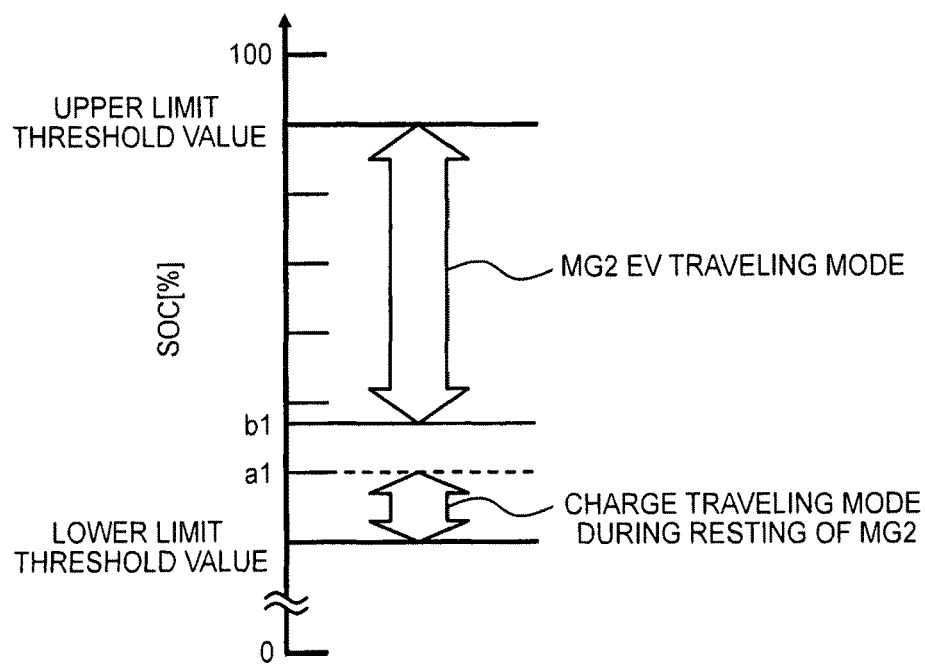
FIG. 10 is a diagram showing an example of a threshold value of switching of a traveling mode in a first overlap area.
Figure 11:
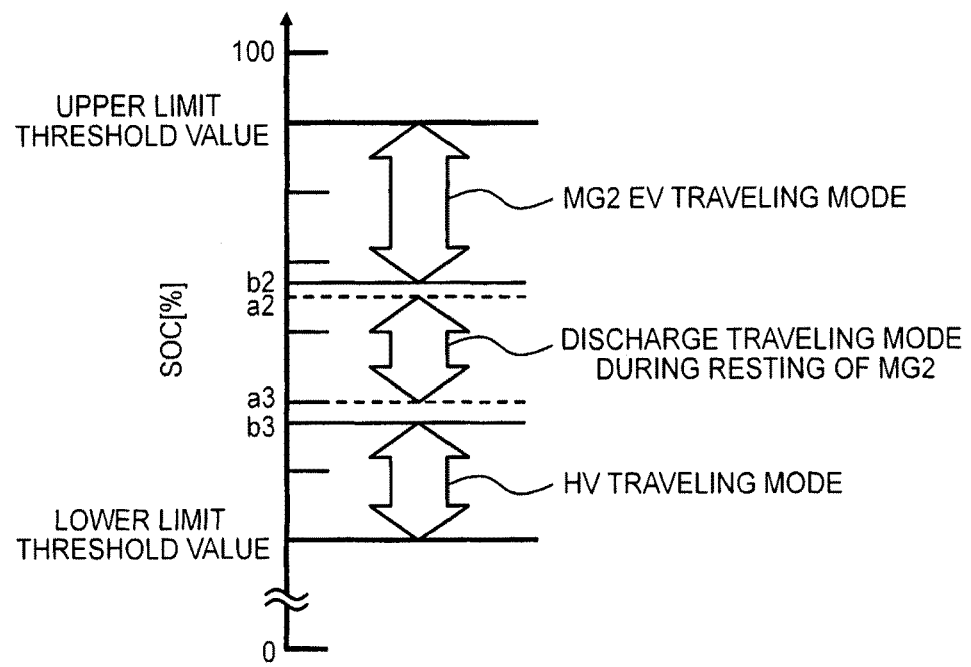
FIG. 11 is a diagram showing an example of a threshold value of switching of a traveling mode in a second overlap area.
Figure 12:
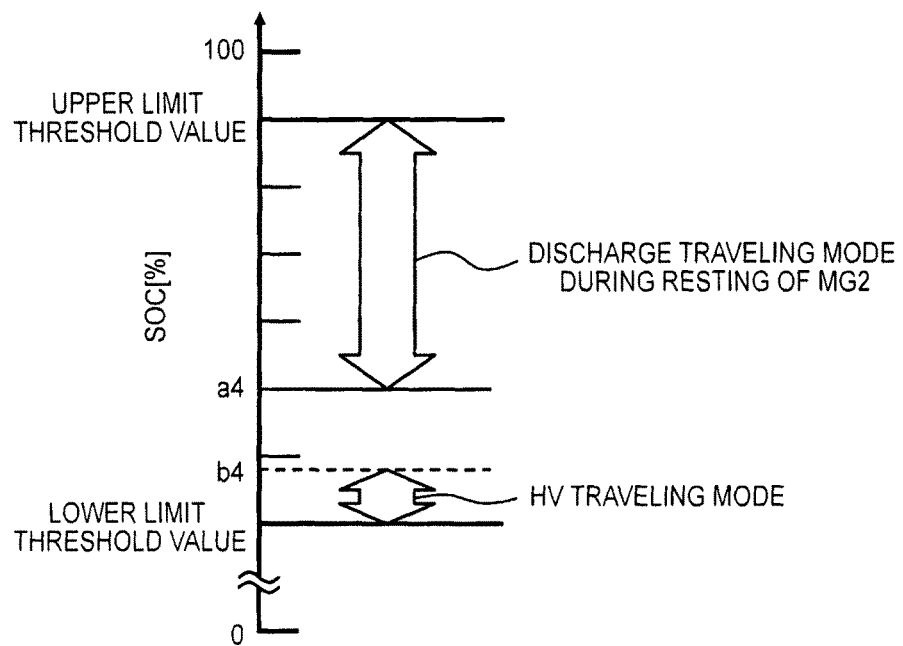
FIG. 12 is a diagram showing an example of a threshold value of switching a traveling mode in a third overlap area.
Figure 13:
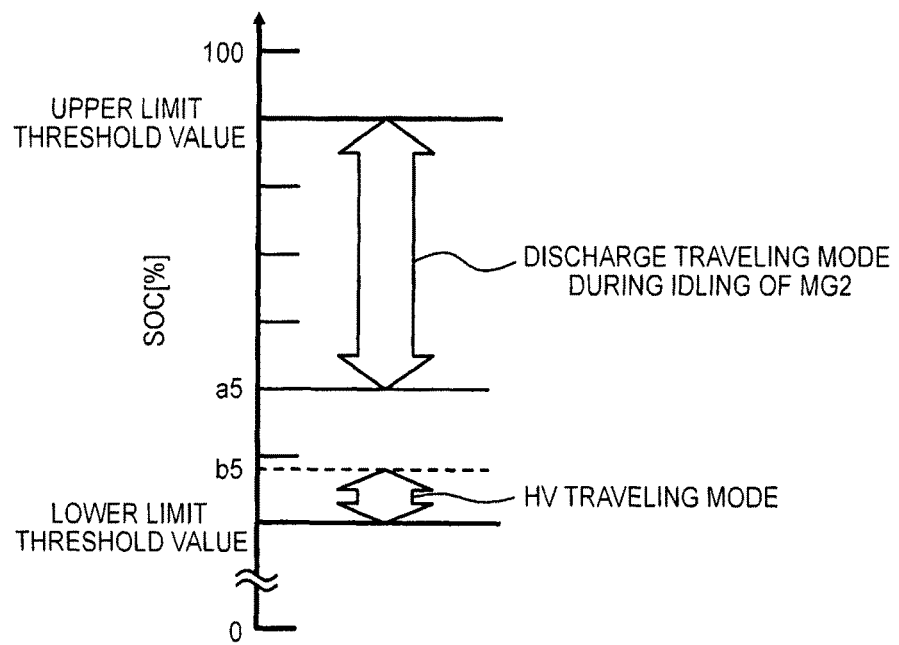
FIG. 13 is a diagram showing an example of a threshold value of switching of a traveling mode in a fourth overlap area.
Figure 14:
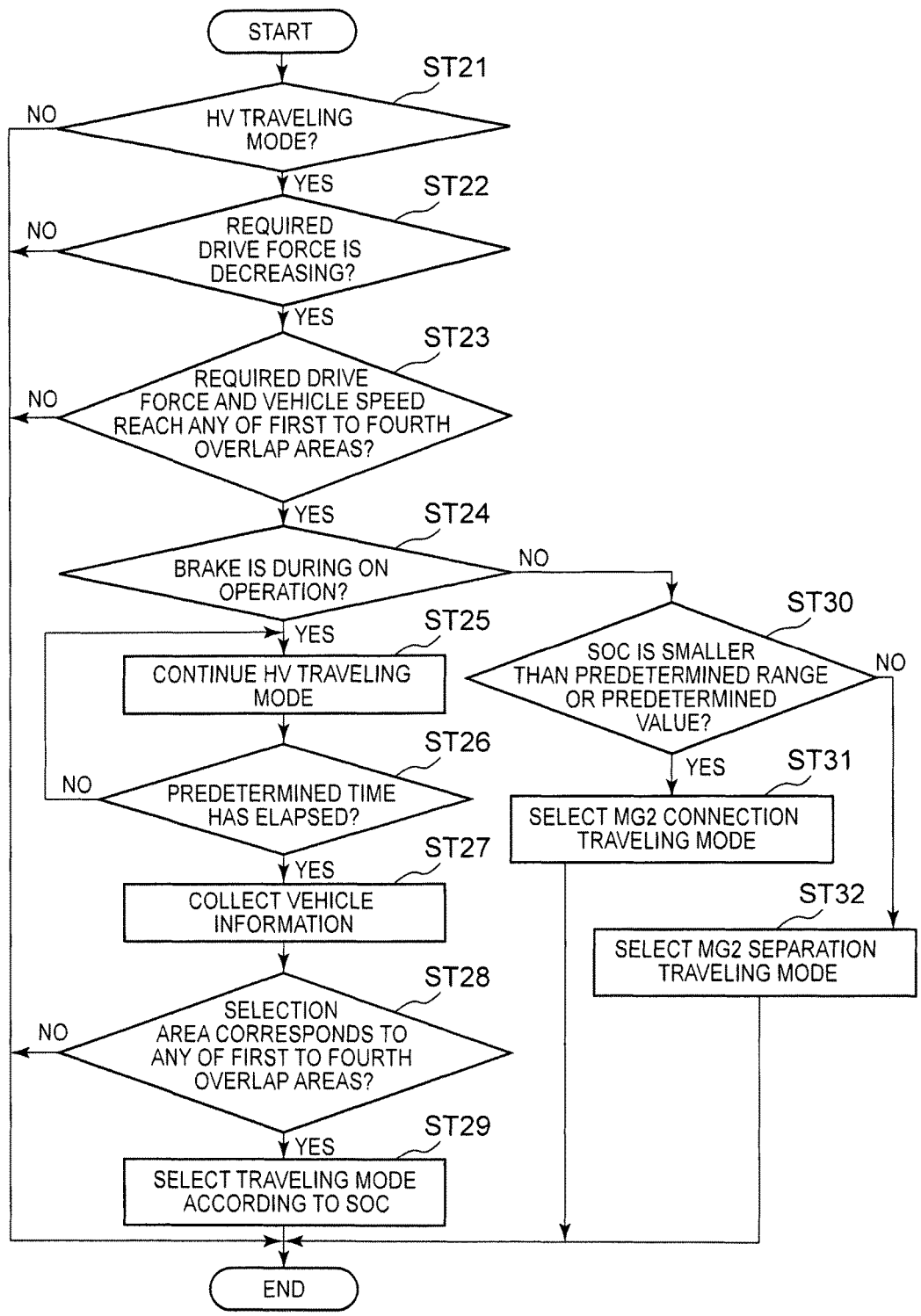
FIG. 14 is a flowchart illustrating selection of a traveling mode.

The selection of a traveling mode in the MG2 separation traveling mode will be described referring to the flowchart of FIG. 9.

The traveling control unit collects vehicle information (Step ST1). The vehicle information is at least information regarding the vehicle speed, information regarding the required drive force for the driving wheel W, and information regarding the SOC of the secondary battery 25.

The traveling control unit determines whether or not a combination of the vehicle speed and the required drive force for the driving wheel W is present in the first overlap area A, that is, whether or not it is the first overlap area A (Step ST2).

When it is the first overlap area A, the traveling control unit determines whether or not the SOC is smaller than a predetermined value (Step ST3). For example, the predetermined value is a threshold value (that is, the SOC when the secondary battery 25 is full-charged or nearly full-charged) when charging of the secondary battery 25 is inhibited.

When the SOC is smaller than the predetermined value, the traveling control unit selects the charge traveling mode during resting of MG2 (Step ST4). With this, in this case, the secondary battery 25 can be charged. When the SOC is equal to or greater than the predetermined value, the traveling control unit selects the MG2 EV traveling mode (Step ST5). With this, in this case, the secondary battery 25 can be discharged.

In this way, the traveling control unit can take the SOC of the secondary battery 25 into consideration at the time of selecting a traveling mode of the first overlap area A. For this reason, the traveling control unit can select a traveling mode with low loss accompanied by resting of the second rotary machine MG2. Accordingly, it is possible to improve fuel efficiency.

The predetermined value of Step ST3 may be a threshold value (that is, the SOC when charging of the secondary battery 25 is required) when discharging of the secondary battery 25 is inhibited. In this case, the traveling control unit selects the MG2 EV traveling mode to discharge the secondary battery 25 when the SOC is greater than the predetermined value, and selects the charge traveling mode during resting of MG2 to charge the secondary battery 25 when the SOC is equal to or smaller than the predetermined value.

When it is determined in Step ST2 that it is not the first overlap area A, next, the traveling control unit determines whether or not the combination of the vehicle speed and the required drive force for the driving wheel W is present in the second overlap area B, that is, whether or not it is the second overlap area B (Step ST6).

When it is the second overlap area B, the traveling control unit determines whether or not the SOC is in a predetermined range (Step ST7). The predetermined range has, for example, a lower limit value which is the SOC when charging of the secondary battery 25 is required and an upper limit value which is the SOC when charging of the secondary battery 25 is inhibited.

When the SOC is in the predetermined range, the traveling control unit selects the discharge traveling mode during resting of MG2 (Step ST8). With this, in this case, the secondary battery 25 can be discharged.

In contrast, when the SOC is outside the predetermined range, the traveling control unit determines whether or not the SOC is smaller than the predetermined range (Step ST9).

When the SOC is greater than the predetermined range, the traveling control unit progresses to Step ST5, and selects the MG2 EV traveling mode, discharging the secondary battery 25. When the SOC is smaller than the predetermined range, the traveling control unit selects the HV traveling mode (Step ST10). With this, in this case, the secondary battery 25 can be charged.

In this way, at the time of selecting a traveling mode of the second overlap area B, the MG2 EV traveling mode, the discharge traveling mode during resting of MG2, and the HV traveling mode are selected in a descending order of the SOC of the secondary battery 25. For this reason, the traveling control unit can select a traveling mode with low loss accompanied by resting of the second rotary machine MG2 according to the SOC. Accordingly, it is possible to improve fuel efficiency. Also, when the SOC becomes small, the MG2 EV traveling mode is switched to the discharge traveling mode during resting of MG2, and charging of the secondary battery 25 is required, the traveling control unit can be led to the HV traveling mode. That is, the traveling control unit can suppress rapid change of a traveling mode and can continue traveling with less uncomfortable feeling.

When it is determined in Step ST6 that it is not the second overlap area B, next, the traveling control unit determines whether or not the combination of the vehicle speed and the required drive force for the driving wheel W is present in the third overlap area C, that is, whether or not it is the third overlap area C (Step ST11).

When it is the third overlap area C, the traveling control unit determines whether or not the SOC is smaller than a predetermined value (Step ST12). As the predetermined value, the same value (the threshold value when charging of the secondary battery 25 is inhibited) as when it is the first overlap area A may be used.

When the SOC is smaller than the predetermined value, the traveling control unit progresses to Step ST10, and selects the HV traveling mode to charge the secondary battery 25. When the SOC is equal to or greater than the predetermined value, the traveling control unit progresses to Step ST8, and selects the discharge traveling mode during resting of MG2 to discharge the secondary battery 25. In this way, the traveling control unit can select a traveling mode with low loss accompanied by resting of the second rotary machine MG2 according to the SOC. Accordingly, it is possible to improve fuel efficiency.

The predetermined value of Step ST12 may be the threshold value when discharging of the secondary battery 25 is inhibited. In this case, when the SOC is greater than the predetermined value, the traveling control unit selects the discharge traveling mode during resting of MG2 to discharge the secondary battery 25, and when the SOC is equal to or smaller than the predetermined value, the traveling control unit selects the HV traveling mode to charge the secondary battery 25.

When it is determined in Step ST11 that it is not the third overlap area C, next, the traveling control unit determines whether or not the combination of the vehicle speed and the required drive force for the driving wheel W is present in the fourth overlap area D, that is, whether or not it is the fourth overlap area D (Step ST13).

When it is the fourth overlap area D, the traveling control unit determines whether or not the SOC is smaller than a predetermined value (Step ST14). As the predetermined value, the same value (the threshold value when charging of the secondary battery 25 is inhibited) as when it is the first overlap area A or the third overlap area C may be used.

When the SOC is smaller than the predetermined value, the traveling control unit progresses to Step ST10, and selects the HV traveling mode to charge the secondary battery 25. When the SOC is equal to or greater than the predetermined value, the traveling control unit selects the discharge traveling mode during idling of MG2 (Step ST15). With this, in this case, the secondary battery 25 can be discharged. In this way, the traveling control unit selects the discharge traveling mode during idling of MG2, whereby it is possible to suppress degradation of output responsiveness of MG2 torque Tmg2 and to suppress deterioration of drivability.

The predetermined value of Step ST14 may be the threshold value when discharging of the secondary battery 25 is inhibited. In this case, when the SOC is greater than the predetermined value, the traveling control unit selects the discharge traveling mode during idling of MG2 to discharge the secondary battery 25, and when the SOC is equal to or smaller than the predetermined value, the traveling control unit selects the HV traveling mode to charge the secondary battery 25.

As described above, the control device for a vehicle of this example can select the charge traveling mode during resting of MG2, the discharge traveling mode during resting of MG2, and the discharge traveling mode during idling of MG2 for the MG2 separation traveling mode in which the second rotary machine MG2 is separated from the reduction shaft 53. For this reason, the control device for a vehicle enables traveling with low loss by separation of the second rotary machine MG2 from the reduction shaft 53 and can appropriately perform charging or discharging of the secondary battery 25. The control device for a vehicle achieves further reduction in loss during resting of MG2. Furthermore, the control device for a vehicle makes the second rotary machine MG2 idle, whereby it is possible to perform switching from the discharge traveling mode during idling of MG2 to the MG2 connection traveling mode with excellent responsiveness.

In regard to a traveling mode, when an operation of a driver with a high frequency of change, such as change in accelerator opening, is performed, switching control is frequently operated. However, the control device for a vehicle can select the charge traveling mode during resting of MG2, the discharge traveling mode during resting of MG2, and the discharge traveling mode during idling of MG2 according to the vehicle speed. Therefore, it is possible to suppress frequent switching of a traveling mode due to the operation of the driver.

The control device for a vehicle can select an optimum traveling mode according to the connection state or the disconnection state between the second rotary machine MG2 and the reduction shaft 53 with a few indexes including the vehicle speed, the required drive force for the driving wheel W, and the SOC of the secondary battery 25. For this reason, the control device for a vehicle has simple calculation processing when selecting a traveling mode, and as a result, it is possible to execute traveling control in the selected traveling mode with excellent responsiveness. Furthermore, the control device for a vehicle can select various traveling modes described above using the detection values of a measuring instrument, such as an existing sensor, without further providing a measuring instrument, such as a new sensor. For this reason, the control device for a vehicle can select a traveling mode with excellent accuracy while suppressing an increase in cost.

On the other hand, if the SOC is changed, the traveling control unit can switch the MG2 connection traveling mode and the MG2 separation traveling mode according to the vehicle speed and the required drive force for the driving wheel W at this time. At this time, the traveling control unit performs comparison/determination of the SOC and the threshold value. Accordingly, it is desirable that a threshold value for determination of switching to be compared with the SOC has the following hysteresis. A threshold value is determined such that the MG2 separation traveling mode can be maintained for a long time.

When switching from the MG2 separation traveling mode to the MG2 connection traveling mode is performed with an increase in the SOC, and switching from the MG2 connection traveling mode to the MG2 separation traveling mode is performed with a decrease in the SOC, a threshold value a for determination of switching to the MG2 separation traveling mode is set to be greater than a threshold value b for determination of switching to the MG2 connection traveling mode, whereby the duration of the MG2 separation traveling mode is extended compared to a case where switching to a traveling mode is performed only with the single threshold value a. When switching from the MG2 connection traveling mode to the MG2 separation traveling mode is performed with an increase in the SOC, and switching from the MG2 separation traveling mode to the MG2 connection traveling mode is performed with a decrease in the SOC, the threshold value b is set to be smaller than the threshold value a, whereby the duration of the MG2 separation traveling mode is extended. By the setting of the threshold values a, b, in the hybrid system 2, it is possible to maintain traveling in the MG2 separation traveling mode for as long a time as possible compared to switching of a traveling mode is performed only with the single threshold value a. Therefore, it is possible to continue traveling for a long time in a state where loss is reduced compared to the MG2 connection traveling mode, and to improve fuel efficiency. According to the threshold values a, b, it is possible to suppress frequent switching between the MG2 connection traveling mode and the MG2 separation traveling mode. Therefore, it is possible reduce a feeling of being busy of the driver with change in traveling mode.

When the hybrid vehicle is provided with a driving support device, such as an automatic driving device or a cruise control device, it is desirable that the hysteresis (the difference between the threshold value a and the threshold value b) is set to be small compared to a vehicle provided with no driving support device. With this, in the hybrid vehicle, it is possible to achieve both driving with less loss due to the expansion of the traveling area of the MG2 separation traveling mode and driving with less troublesomeness of driving operation by the driving support device. Therefore, in the hybrid vehicle, it is possible to allow the driver to perform convenient driving while obtaining the above effects by providing the hysteresis.

Specifically, in the first overlap area A, switching from the charge traveling mode during resting of MG2 to the MG2 EV traveling mode is performed with an increase in the SOC; and switching from the MG2 EV traveling mode to the charge traveling mode during resting of MG2 is performed with a decrease in the SOC. For this reason, in the first overlap area A, a threshold value b1 for determination of switching from the charge traveling mode to the MG2 EV traveling mode is set to be greater than a threshold value a1 for determination of switching from the MG2 EV traveling mode to the charge traveling mode during resting of MG2 (FIG. 10), whereby the state of the charge traveling mode during resting of MG2 in which the second rotary machine MG2 is separated from the reduction shaft 53 is continued for a long time. A "lower limit threshold value" in FIG. 10 indicates a lower limit value available in the secondary battery 25 of the hybrid vehicle with the SOC (the same applies to FIGS. 11 to 13). An "upper limit threshold value" indicates an upper limit value available in the secondary battery 25 of the hybrid vehicle with the SOC (the same applies to FIGS. 11 to 13).

In the second overlap area B, switching from the discharge traveling mode during resting of MG2 to the MG2 EV traveling mode is performed with an increase in the SOC, and switching from the MG2 EV traveling mode to the discharge traveling mode during resting of MG2 is performed with a decrease in the SOC. For this reason, in the second overlap area B, a threshold value b2 for determination of switching from the discharge traveling mode to the MG2 EV traveling mode is set to be greater than a threshold value a2 for determination of switching from the MG2 EV traveling mode to the discharge traveling mode during resting of MG2 (FIG. 11), whereby the state of the discharge traveling mode during resting of MG2 in which the second rotary machine MG2 is separated from the reduction shaft 53 is continued for a long time. Furthermore, in the second overlap area B, switching from the HV traveling mode to the discharge traveling mode during resting of MG2 is performed with an increase in the SOC, and switching from the discharge traveling mode during resting of MG2 to the HV traveling mode is performed with a decrease in the SOC. For this reason, in the second overlap area B, a threshold value b3 for determination of switching from the discharge traveling mode during resting of MG2 to the HV traveling mode is set to be smaller than a threshold value a3 for determination of switching from the HV traveling mode to the discharge traveling mode during resting of MG2 (FIG. 11), whereby the state of the discharge traveling mode during resting of MG2 is continued for a long time. It is preferable that the range between the threshold value a3 and the threshold value a2 is set as the predetermined range of Steps ST7, ST9 described above.

In the third overlap area C, switching from the HV traveling mode to the discharge traveling mode during resting of MG2 is performed with an increase in the SOC, and switching from the discharge traveling mode during resting of MG2 to the HV traveling mode is performed with a decrease in the SOC. For this reason, in the third overlap area C, a threshold value b4 for determination of switching from the discharge traveling mode during resting of MG2 to the HV traveling mode is set to be smaller than a threshold value a4 for determination of switching from the HV traveling mode to the discharge traveling mode during resting of MG2 (FIG. 12), whereby the state of the discharge traveling mode during resting of MG2 is continued for a long time.

In the fourth overlap area D, switching from the HV traveling mode to the discharge traveling mode during idling of MG2 is performed with an increase in the SOC, and switching from the discharge traveling mode during idling of MG2 to the HV traveling mode is performed with a decrease in the SOC. For this reason, in the fourth overlap area D, a threshold value b5 for determination of switching from the discharge traveling mode during idling of MG2 to the HV traveling mode is set to be smaller than a threshold value a5 for determination of switching from the HV traveling mode to the discharge traveling mode during idling of MG2 (FIG. 13), whereby the state of the discharge traveling mode during idling of MG2 is continued for a long time.

The required drive force for the driving wheel W is decreased by a brake operation of the driver. For this reason, even if the MG2 separation traveling mode is not a selection target at the present time, there is a possibility that the MG2 separation traveling mode becomes a selection target with a decrease in required drive force. Meanwhile, the required drive force is increased by an accelerator operation of the driver. For this reason, even if the MG2 separation traveling mode is a selection target at the present time, there is a possibility that the MG2 separation traveling mode is excluded from a selection target with an increase in required drive force. Now, an example of calculation processing under such a situation will be described referring to the flowcharts of FIGS. 14 and 15.

The traveling control unit determines whether or not the HV traveling mode is applied as a current traveling mode (Step ST21).

When the current traveling mode is the HV traveling mode, the traveling control unit determines whether or not the required drive force for the driving wheel W is decreasing (Step ST22).

When the required drive force is not decreasing, the traveling control unit ends the calculation processing in order to maintain the current HV traveling mode. When the required drive force is decreasing, the traveling control unit determines whether or not a selection area of a traveling mode corresponds to any of the first to fourth overlap areas A to D based on the required drive force and the vehicle speed, that is, whether or not the combination of the required drive force and the vehicle speed reaches any of the first to fourth overlap areas A to D (Step ST23).

If the combination of the required drive force and the vehicle speed does not reach any of the first to fourth overlap areas A to D, the traveling control unit ends the calculation processing in order to maintain the current HV traveling mode. When the combination of the required drive force and the vehicle speed reaches any of the first to fourth overlap areas A to D, the traveling control unit determines whether or not the driver is performing a brake-on operation (Step ST24).

While the driver is performing the brake-on operation, there is a possibility that the required drive force for the driving wheel W is shifted to a speed reduction side (negative side) immediately after the brake-on operation. Then, when the required drive force is shifted to the speed reduction side, it is necessary to regenerate electric power with the second rotary machine MG2. However, in the hybrid vehicle, when a selection area of a traveling mode is changed from the HV traveling mode to the MG2 separation traveling mode by the brake-on operation, if switching to the MG2 separation traveling mode is made and the second rotary machine MG2 is rested or is made idle, it is necessary to switch a traveling mode from the MG2 separation traveling mode to the HV traveling mode again for regeneration of electric power. For this reason, when switching of a traveling mode is repeated, it takes a lot of time until electric power can be regenerated with the second rotary machine MG2. Accordingly, fuel efficiency is deteriorated with a decrease in regenerative energy to be obtained.

Figure 16:
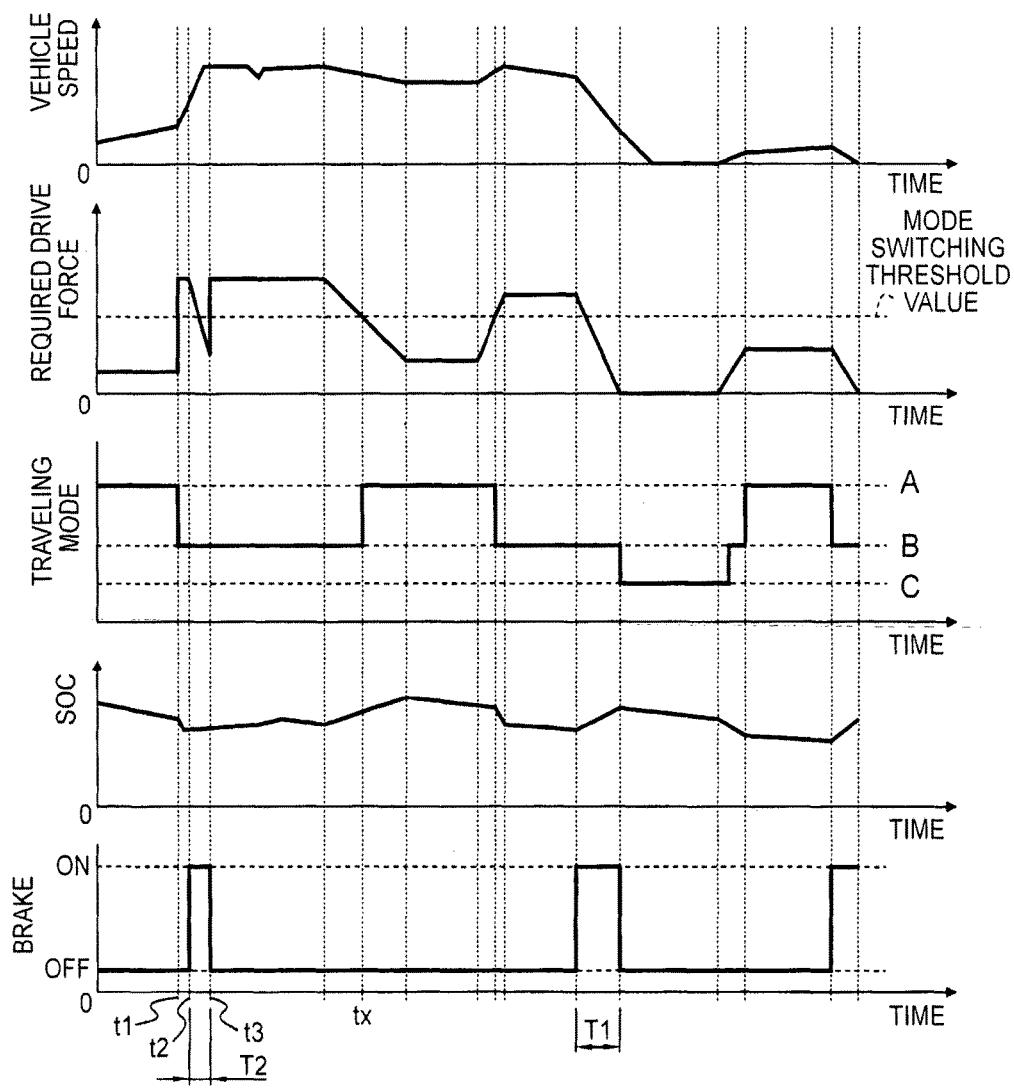
FIG. 16 is a time chart illustrating selection of a traveling mode.

Accordingly, when a selection area of a traveling mode is shifted to an area where the MG2 separation traveling mode is selectable from the HV traveling mode according to the brake-on operation of the driver, and the brake-on operation is continued, the current HV traveling mode is maintained until a predetermined time elapses, and electric power is regenerated with the second rotary machine MG2. Thereafter, a traveling mode to be applied is determined based on the SOC from among traveling modes of an area where the MG2 separation traveling mode is selectable, or a traveling mode to be applied is newly selected based on the vehicle speed, the required drive force, and the SOC. The predetermined time has, for example, the brake-on operation of the driver or switching determination of a selection area of a traveling mode according to the brake-on operation as a starting point. The predetermined time is set to the time for which regenerative energy can be increased immediately with determination of switching of a selection area of a traveling mode compared to a case where the switching is performed. For example, as shown in a section T1 of FIG. 16, the end point of the predetermined time is the end of the brake-on operation of the driver. An illustration of FIG. 16 is a time chart of the second overlap area B. In FIG. 16, for convenience of description, a threshold value (mode switching threshold value) to be compared with the required drive force for determination of switching of a traveling mode is constant regardless of change in vehicle speed. In the hybrid vehicle, it is possible to increase regenerative energy by the extension of the HV traveling mode. Therefore, it becomes easy to cope with a shift of a traveling mode, and as a result, it is possible to improve fuel efficiency.

Accordingly, when it is determined in Step ST24 that the driver is performing the brake-on operation, the traveling control unit continues the current HV traveling mode (Step ST25). Then, the traveling control unit determines whether or not a predetermined time (first predetermined time) has elapsed (Step ST26).

The traveling control unit repeats the calculation processing of Steps ST25, ST26 until the predetermined time elapses. When the predetermined time has elapsed, the traveling control unit collects vehicle information (Step ST27). The vehicle information is at least information regarding the vehicle speed, information regarding the required drive force for the driving wheel W, and information regarding the SOC of the secondary battery 25.

The driver may perform a brake-off operation or an accelerator-on operation from the determination of Step ST23 until this point. For this reason, the traveling control unit determines whether or not a selection area of a traveling mode corresponds to any of the first to fourth overlap areas A to D based on the vehicle speed and the required drive force (Step ST28).

When a selection area of a traveling mode does not correspond to any of the first to fourth overlap areas A to D, the traveling control unit ends the calculation processing. In this case, for example, the extended HV traveling mode is further continued, or a traveling mode to be applied in a selection area of a new traveling mode according to the vehicle and the required drive force is selected. When a selection area of a traveling mode corresponds to any of the first to fourth overlap areas A to D, the traveling control unit selects a traveling mode to be applied from the overlap area based on the SOC (Step ST29). With this, if the selected traveling mode is the HV traveling mode, the traveling control unit maintains the HV traveling mode, and if the selected traveling mode is not the HV traveling mode, the traveling control unit performs switching to the selected traveling mode. For example, in the illustration of FIG. 16, when a predetermined time of a section T1 has elapsed, a combination of the vehicle speed and the required drive force corresponds to the second overlap area B, and it is determined that the SOC is greater than the predetermined range of Steps ST7, ST9, whereby switching to the MG2 EV traveling mode is performed.

When it is determined in Step ST24 that the driver is not during the brake-on operation, for example, the required drive force is decreased with an accelerator-off operation or an accelerator opening decreasing operation of the driver, and a selection area of a traveling mode is shifted to an area (one of the first to fourth overlap areas A to D) where the MG2 separation traveling mode is selectable from the HV traveling mode. When the hybrid vehicle is provided with a driving support device which enables inertial traveling, there is a possibility that the driver desires an idling state according to inertial traveling by the accelerator-off operation. For this reason, when there is change in a selection area of a traveling mode, it is desirable that, if switching to the MG2 separation traveling mode is possible, the switching is performed immediately.

Accordingly, when the required drive force is decreased with the accelerator-off operation or the accelerator opening decreasing operation of the driver (no brake-on operation is performed), and when a selection area of a traveling mode is shifted to an area where the MG2 separation traveling mode is selectable from the HV traveling mode, if the MG2 separation traveling mode is applicable based on the SOC, switching to the MG2 separation traveling mode is performed immediately after the determination to be applicable. With this, in the hybrid vehicle, it is possible to reduce dragging loss of the power transmission device compared to a case where the HV traveling mode is maintained. Accordingly, it is possible to extend inertial traveling. At this time, a shift to the MG2 rest mode is made, whereby it is also possible to reduce dragging loss of the second rotary machine MG2. For this reason, the control device for a vehicle can achieve both improvement of drivability and traveling with low loss.

Accordingly, when it is determined in Step ST24 that the driver is not performing the brake-on operation, the traveling control unit determines whether or not the SOC is smaller than the predetermined range of Steps ST7, ST9 or the predetermined value of Steps ST12, ST14 (Step ST30).

If the SOC is smaller than the predetermined range or the predetermined value, the traveling control unit selects the MG2 connection traveling mode (HV traveling mode or MG2 EV traveling mode) (Step ST31). With this, if the selected traveling mode is the HV traveling mode, the traveling control unit maintains the HV traveling mode, and if the selected traveling mode is not the HV traveling mode, the traveling control unit performs switching to the MG2 EV traveling mode. If the SOC is not smaller than the predetermined range or the predetermined value, the traveling control unit selects the MG2 separation traveling mode in the corresponding overlap area (Step ST32). With this, the traveling control unit performs switching to the selected MG2 separation traveling mode. For example, in the illustration of FIG. 16, the discharge traveling mode during resting of MG2 is selected at the time tx.

Figure 15:
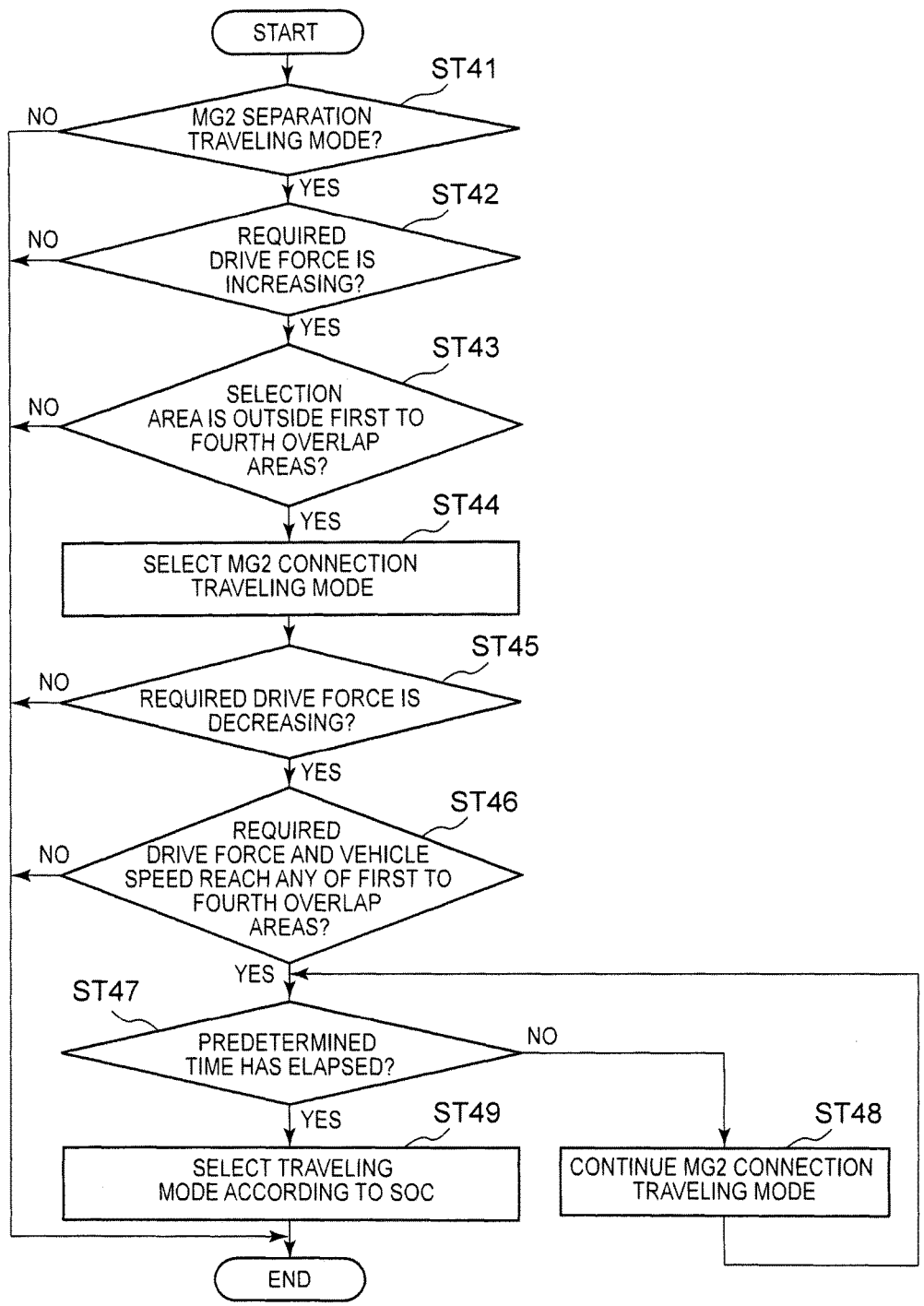
FIG. 15 is a flowchart illustrating selection of a traveling mode.

Next, when it is determined in Step ST21 that the current traveling mode is not the HV traveling mode, as shown in the flowchart of FIG. 15, the traveling control unit determines whether or not the current traveling mode is the MG2 separation traveling mode (Step ST41).

When the current traveling mode is not the MG2 separation traveling mode, the traveling control unit ends the calculation processing. When the current traveling mode is the MG2 separation traveling mode, the traveling control unit determines whether or not the required drive force for the driving wheel W is increasing (Step ST42).

When the required drive force is not increasing, the traveling control unit ends the calculation processing in order to maintain the current traveling mode. When the required drive force is increasing, the traveling control unit determines whether or not a selection area of a traveling mode is outside the first to fourth overlap areas A to D based on the required drive force and the vehicle speed (Step ST43).

When a selection area of a traveling mode is not outside the first to fourth overlap areas A to D, the traveling control unit ends the calculation processing in order to maintain the current traveling mode. When a selection area of a traveling mode is outside the first to fourth overlap areas A to D, the traveling control unit selects the MG2 connection traveling mode (HV traveling mode or MG2 EV traveling mode) based on the vehicle speed, the required drive force, and the SOC (Step ST44). With this, the traveling control unit performs switching to the selected MG2 connection traveling mode.

Then, the traveling control unit determines whether or not the required drive force is decreasing (Step ST45). This determination is executed, for example, until the predetermined time (second predetermined time) elapses after the selection of Step ST44 is performed.

When the required drive force is not decreasing, the traveling control unit ends the calculation processing. With this, at this time, for example, the MG2 connection traveling mode selected in Step ST44 is continued. When the required drive force is decreasing, the traveling control unit determines whether or not a combination of the required drive force and the vehicle speed reaches any area of the first to fourth overlap areas A to D (Step ST46).

When the combination of the required drive force and the vehicle speed does not reach any area of the first to fourth overlap areas A to D, the traveling control unit ends the calculation processing. With this, at this time, for example, the MG2 connection traveling mode selected in Step ST44 is continued. When the combination of the required drive force and the vehicle speed reaches any area of the first to fourth overlap areas A to D, the traveling control unit determines whether or not the predetermined time (second predetermined time) has elapsed (Step ST47). The predetermined time is an elapsed time after the selection of the MG2 connection traveling mode of Step ST44 is performed, and is, for example, a time until a brake-on operation is ended.

When the predetermined time has not elapsed, the traveling control unit continues the MG2 connection traveling mode selected in Step ST44 (Step ST48), and returns to Step ST47. That is, when switching from the MG2 separation traveling mode to the MG2 connection traveling mode is performed with an increase in the required drive force according to an accelerator-on operation, the traveling control unit maintains the MG2 connection traveling mode until the predetermined time elapses even if a selection area of a traveling mode is changed from the MG2 connection traveling mode to the MG2 separation traveling mode with a decrease in the required drive force according to a brake-on operation until the predetermined time elapses after the switching is performed. When the predetermined time has elapsed, the traveling control unit selects a corresponding traveling mode based on the SOC (Step ST49). With this, if the MG2 connection traveling mode of Step ST44 is selected, the traveling control unit continues the MG2 connection traveling mode, and if a traveling mode other than the MG2 connection traveling mode is selected, the traveling control unit performs switching to the selected traveling mode.

For example, in the illustration of FIG. 16, an accelerator-off operation and a brake-on operation are performed immediately after switching from the discharge traveling mode during resting of MG2 to the HV traveling mode with an increase in the required drive force at the time t1. Accordingly, a selection area of a traveling mode is changed from the HV traveling mode to the discharge traveling mode during resting of MG2 with a decrease in the required drive force at the time t2. However, the traveling control unit continues the HV traveling mode until a predetermined time t3 (section T2) elapses. In this illustration, the HV traveling mode is continued by the SOC even after the predetermined time t3 has elapsed.

In this way, the traveling control unit continues the MG2 connection traveling mode switched with an increase in the required drive force for the predetermined time even under a situation in which increasing and decreasing the required drive force are consecutively performed and switching from the MG2 connection traveling mode to the MG2 separation traveling mode is selected, and thereafter, performs switching of a traveling mode as necessary. For this reason, according to the control device for a vehicle, even if increasing and decreasing the required drive force requiring switching of a traveling mode are performed in succession, switching of a traveling mode is not frequently performed. Therefore, the control device for a vehicle can suppress an increase in loss due to rotation fluctuation of the second rotary machine MG2 caused by frequent switching of a traveling mode, and can suppress a feeling of being busy (drivability deterioration) caused by frequent switching of a traveling mode.

The invention claimed is:

1. A control device for a vehicle, the vehicle including an engine, a first rotary machine, a second rotary machine, a power transmission device, a battery, a first clutch, and a second clutch, the power transmission device including a first rotary element connected to a rotation shaft of the engine, a second rotary element connected to a rotation shaft of the first rotary machine, and a third rotary element connected to a driving wheel of the vehicle via a power transmission shaft, the power transmission device configured to transmit a reaction force of output torque of the engine to the first rotary machine, the battery configured to supply and receive electric power to and from the first rotary machine and the second rotary machine, the first clutch configured to selectively connect the second rotary machine to the power transmission shaft, the second clutch being a one-way clutch, the second clutch configured to connect the second rotary machine and the power transmission shaft only when the rotation of the second rotary machine is synchronized with the rotation of the power transmission shaft, the second clutch being arranged in parallel to the first clutch on a power transmission path between the second rotary machine and the power transmission shaft, the control device comprising:

an ECU configured to select a traveling mode of the vehicle from a plurality of traveling modes based on vehicle speed and required drive force for the driving wheel, the ECU including a first traveling mode, the first traveling mode including a second traveling mode, a third traveling mode, and a fourth traveling mode, the first traveling mode being a traveling mode in which the first clutch and the second clutch separate the connection of the second rotary machine and the power transmission shaft, the second traveling mode being a traveling mode in which the second rotary machine is rested while charging the battery with electric power by regenerative drive of the first rotary machine, the third traveling mode being a traveling mode in which the second rotary machine is rotated at a lower speed than a rotation speed of the third rotary element while discharging the battery by powering drive of the first rotary machine, the fourth traveling mode being a traveling mode in which the second rotary machine is rested while discharging the battery by powering drive of the first rotary machine, the ECU configured to control the connection of the second rotary machine and the power transmission shaft by the first clutch, and the ECU configured to select the second traveling mode when the vehicle speed is in a low vehicle speed range equal to or lower than a first predetermined vehicle speed when the ECU selects the first traveling mode, select the third traveling mode when the vehicle speed is in a high vehicle speed range equal to or higher than a second predetermined vehicle speed greater than the first predetermined vehicle speed, and select the fourth traveling mode when the vehicle speed is in a vehicle speed range between the low vehicle speed range and the high vehicle speed range.

2. The control device according to claim 1, wherein the ECU includes a fifth traveling mode, the fifth traveling mode includes a sixth traveling mode and a seventh traveling mode, the fifth traveling mode is a traveling mode in which the second rotary machine is connected to the power transmission shaft, the sixth traveling mode is a traveling mode in which the vehicle travels only with power of the engine or with power of the engine and the second rotary machine, the seventh traveling mode is a traveling mode in which the vehicle travels with power of the second rotary machine, and the ECU is configured to select a traveling mode from the traveling modes included in the fifth traveling mode and the first traveling mode based on a SOC of the battery when a selection area of a traveling mode based on the vehicle speed and the required drive force is an area where both the fifth traveling mode and the first traveling mode are selectable.

3. The control device according to claim 2, wherein the ECU is configured to perform switching from the first traveling mode to the fifth traveling mode with an increase in the SOC,
the ECU is configured to perform switching from the fifth traveling mode to the first traveling mode with a decrease in the SOC, and
a threshold value of the SOC for determining the switching from the first traveling mode to the fifth traveling mode is greater than a threshold value of the SOC for determining the switching from the fifth traveling mode to the first traveling mode.

4. The control device according to claim 2, wherein the ECU is configured to perform switching from the fifth traveling mode to the first traveling mode with an increase in the SOC,
the ECU is configured to perform switching from the first traveling mode to the fifth traveling mode with a decrease in the SOC, and
a threshold value of the SOC for determining the switching from the first traveling mode to the fifth traveling mode is smaller than a threshold value of the SOC for determining the switching from the fifth traveling mode to the first traveling mode.

5. The control device according to claim 1, wherein the ECU includes a fifth traveling mode, the fifth traveling mode includes a sixth traveling mode and a seventh traveling mode, the fifth traveling mode is a traveling mode in which the second rotary machine is connected to the power transmission shaft, the sixth traveling mode is a traveling mode in which the vehicle travels only with power of the engine or with power of the engine and the second rotary machine, the seventh traveling mode is a traveling mode in which the vehicle travels with power of the second rotary machine, and
the ECU is configured to maintain the sixth traveling mode, currently selected, until a predetermined time elapses when a selection area of a traveling mode is shifted to an area where the first traveling mode is selectable from the sixth traveling mode according to a brake-on operation of a driver and the brake-on operation is continued, and thereafter, to select a traveling mode to be applied from traveling modes of an area where the first traveling mode is selectable.

6. The control device according to claim 2, wherein the ECU is configured to maintain the sixth traveling mode, currently selected, until a predetermined time elapses when a selection area of a traveling mode is shifted to an area where the first traveling mode is selectable from the sixth traveling mode according to a brake-on operation of a driver and the brake-on operation is continued, and thereafter, to select a traveling mode to be applied from traveling modes of an area where the first traveling mode is selectable.

7. The control device according to claim 2, wherein the ECU is configured to perform switching to the first traveling mode immediately after is the ECU determines that the first traveling mode is applicable based on the SOC when a selection area of a traveling mode is shifted to an area where the first traveling mode is selectable from the sixth traveling mode with a decrease in the required drive force.

8. The control device according to claim 1, wherein the ECU includes a fifth traveling mode, the fifth traveling mode includes a sixth traveling mode, the fifth traveling mode is a traveling mode in which the second rotary machine is connected to the power transmission shaft, the sixth traveling mode is a traveling mode in which the vehicle travels only with power of the engine or with power of the engine and the second rotary machine, and
the ECU is configured to maintain the sixth traveling mode until a predetermined time elapses when switching from the first traveling mode to the sixth traveling mode is performed with an increase in the required drive force even when a selection area of a traveling mode is changed from the sixth traveling mode to the first traveling mode until the predetermined time elapses after the switching is performed.

9. The control device according to claim 2, wherein the ECU is configured to maintain the sixth traveling mode until a predetermined time elapses when switching from the first traveling mode to the sixth traveling mode is performed with an increase in the required drive force even when a selection area of a traveling mode is changed from the sixth traveling mode to the first traveling mode until the predetermined time elapses after the switching is performed.

* * * * *